United States Patent
Nelson et al.

(10) Patent No.: US 11,281,864 B2
(45) Date of Patent: *Mar. 22, 2022

(54) DEPENDENCY GRAPH BASED NATURAL LANGUAGE PROCESSING

(71) Applicant: ACCENTURE GLOBAL SOLUTIONS LIMITED, Dublin (IE)

(72) Inventors: Paul Edward Nelson, Annapolis, MD (US); Esteban Alberto Alvarado Solano, San Jose (CR); Rafael Guillermo Alfaro Flores, San Jose (CR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,726

(22) Filed: Jul. 24, 2020

(65) Prior Publication Data
US 2020/0356726 A1    Nov. 12, 2020

Related U.S. Application Data

(63) Continuation-in-part of application No. 16/226,132, filed on Dec. 19, 2018, now Pat. No. 10,747,958.

(51) Int. Cl.
*G06F 15/00*    (2006.01)
*G06F 40/30*    (2020.01)
(Continued)

(52) U.S. Cl.
CPC ............ *G06F 40/30* (2020.01); *G06F 40/117* (2020.01); *G06N 3/08* (2013.01)

(58) Field of Classification Search
CPC .... G06F 40/117; G06F 40/211; G06F 40/242; G06F 40/284; G06F 40/30; G06N 3/08; G06N 5/003
(Continued)

(56) References Cited

U.S. PATENT DOCUMENTS 4,994,966 A  *  2/1991  Hutchins ............... G06F 40/253
                                                                704/9
5,418,717 A     5/1995  Su et al.
(Continued)

FOREIGN PATENT DOCUMENTS

EP    2184685    5/2010
EP    2953037    12/2015
(Continued)

OTHER PUBLICATIONS

Arab Meysam et al., "A graph-based approach to word sense disambiguation. An unsupervised method based on semantic relatedness", 2016 24th Iranian conference on Electrical Engineering (ICCE), May 10, 2016, pp. 250-255.
(Continued)

*Primary Examiner* — Khai N. Nguyen
(74) *Attorney, Agent, or Firm* — Mannava & Kang, P.C.

(57) ABSTRACT

Examples of automatically generating natural language pipelines to process an input to generate tags, semantic or syntactic, are described. In an example, on receiving a request to process input data to generate tags, a dependency graph, based on identified dependees and further dependees may be created to satisfy the request, the dependency graph including natural language operations arranged in order of their dependencies on each other. Based on the dependency graph, a pipeline for the tags may be automatically generated, which includes a series of natural language operations such that the operations for dependee tags are processed before any of their associated depender tags. Further, the dependency graph and the automated pipeline generation allows for automated optimization of the pipeline, training, re-training, testing and regression testing of the semantic tags and supporting machine learning models and provides
(Continued)

a framework to efficiently manage the sharing and reuse of semantic understanding operations.

21 Claims, 14 Drawing Sheets

(51) Int. Cl.
 G06F 40/117 (2020.01)
 G06N 3/08 (2006.01)
(58) Field of Classification Search
 USPC .................................................. 704/9
 See application file for complete search history.

(56) References Cited

U.S. PATENT DOCUMENTS

| | | | | |
|---|---|---|---|---|
| 5,490,061 | A * | 2/1996 | Tolin | G06F 40/279 |
| | | | | 704/2 |
| 6,598,018 | B1 * | 7/2003 | Junqua | G10L 15/22 |
| | | | | 704/231 |
| 6,631,346 | B1 * | 10/2003 | Karaorman | G10L 15/1822 |
| | | | | 704/275 |
| 7,398,201 | B2 * | 7/2008 | Marchisio | G06F 40/35 |
| | | | | 704/9 |
| 9,053,089 | B2 * | 6/2015 | Bellegarda | G06F 40/284 |
| 9,361,587 | B2 * | 6/2016 | Bounouane | G06F 40/279 |
| 9,390,087 | B1 * | 7/2016 | Roux | G06F 16/3329 |
| 10,528,664 | B2 * | 1/2020 | Nelson | G06F 40/211 |
| 10,534,863 | B2 * | 1/2020 | Song | G06N 5/02 |
| 10,747,958 | B2 * | 8/2020 | Nelson | G06N 20/00 |
| 2003/0158723 | A1 * | 8/2003 | Masuichi | G06F 40/30 |
| | | | | 704/4 |
| 2004/0049375 | A1 * | 3/2004 | Brittan | G10L 13/07 |
| | | | | 704/9 |
| 2004/0090439 | A1 | 5/2004 | Dillner | |
| 2007/0016401 | A1 * | 1/2007 | Ehsani | G10L 15/005 |
| | | | | 704/9 |
| 2007/0192085 | A1 * | 8/2007 | Roulland | G06F 16/3329 |
| | | | | 704/9 |
| 2008/0071800 | A1 * | 3/2008 | Neogi | G06F 9/542 |
| 2008/0091408 | A1 * | 4/2008 | Roulland | G06F 40/211 |
| | | | | 704/9 |
| 2008/0104032 | A1 * | 5/2008 | Sarkar | G06F 16/958 |
| 2009/0089058 | A1 * | 4/2009 | Bellegarda | G06F 40/30 |
| | | | | 704/251 |
| 2009/0216884 | A1 * | 8/2009 | Larvet | G06F 8/20 |
| | | | | 709/226 |
| 2010/0262576 | A1 | 10/2010 | Stockwell et al. | |
| 2014/0250047 | A1 * | 9/2014 | Bounouane | G06N 7/005 |
| | | | | 706/52 |
| 2015/0066477 | A1 * | 3/2015 | Hu | G06F 40/211 |
| | | | | 704/9 |
| 2015/0088484 | A1 * | 3/2015 | Bostick | G06F 40/40 |
| | | | | 704/2 |
| 2015/0277900 | A1 * | 10/2015 | O'Keeffe | G06F 8/70 |
| | | | | 717/113 |
| 2017/0199928 | A1 * | 7/2017 | Zhao | G06F 16/9024 |
| 2017/0357625 | A1 * | 12/2017 | Carpenter | G06F 16/322 |
| 2018/0089572 | A1 * | 3/2018 | Aili | G06F 8/41 |
| 2018/0157642 | A1 * | 6/2018 | Matskevich | G06F 40/284 |
| 2018/0225281 | A1 * | 8/2018 | Song | G06F 40/30 |
| 2018/0260385 | A1 * | 9/2018 | Fan | G06F 40/274 |
| 2018/0373507 | A1 * | 12/2018 | Mizrahi | G06F 8/36 |
| 2020/0201940 | A1 * | 6/2020 | Nelson | G06F 40/284 |
| 2020/0356726 | A1 * | 11/2020 | Nelson | G06N 3/08 |

FOREIGN PATENT DOCUMENTS

| | | |
|---|---|---|
| WO | 97/48058 A1 | 12/1997 |
| WO | 2016/044321 A1 | 3/2016 |

OTHER PUBLICATIONS

Rada Mihalcea, "Unsupervised large-vocabulary word sense disambiguation with graph-based algorithms for sequence data labeling", Human Language Technology and Empirical Methods in Natural Language Processing, Association for Computational Linguistics, Stroudsburg, Pennsylvania, Oct. 6, 2005, pp. 411-418.

* cited by examiner

DEPENDENCY GRAPH BASED NATURAL LANGUAGE PROCESSING

CROSS-REFERENCE TO RELATED APPLICATION

This application is a continuation-in-part of and claims priority to U.S. application Ser. No. 16/226,132 filed on Dec. 19, 2018, the disclosure of which is incorporated by reference in its entirety.

BACKGROUND

Natural language processing ("NLP") involves processing of a natural language input. A natural language input may be understood as a human language used by a person to interact with a computing system. NLP is used to provide assistance in a variety of domains, for instance, processing of forms to gather relevant data, processing of contracts for analyzing relevant clauses, processing of reports, processing of real-time user natural language requests, etc. An NLP based computing system may attempt to process data or perform actions based on the natural language input. However, in order to do so, the NLP system must determine the precise meaning of the natural language input such that the natural language input can be understood and acted upon by the NLP system.

Various natural language processing systems have been developed in the past. However, such natural language processing systems either lack intelligence and a technically advanced framework for determining an appropriate interpretation for a natural language input or may not be scalable owing to complexities involved in determining an accurate, complete and sufficiently nuanced interpretation. Additionally, as the complexities increase, processing time and power required for dealing with such complex inputs may also increase, and therefore available natural language processing systems may not be able to efficiently handle such complex inputs. Finally, as the coverage and sophistication of the natural language model increases, the time it requires for software development and administrative maintenance increases to the point that such systems are no longer cost effective.

For instance, NLP has traditionally been structured as a series of execution modules arranged in a pipeline, such as tokenizing, normalization, and classification. Generally, the pipelines are pre-configured and re-used wherever similar processing has been required. As NLP has grown, so has the multitude of artificial intelligence (AI) and Machine Learning (ML) models which are available to process text. Each AI or ML model typically has a targeted purpose, for example to identify a risk in a clause of a contract or to extract an employee name from full text. Each such AI or ML model requires an input to be prepared in a certain manner and may have a corresponding pipeline to provide the desired output.

The problem arises when there are a large number of such models required to fully understand a set of complex natural language text at all levels of understanding. Managing such a large number of different natural language pipelines to handle a wide variety of ways in which the natural language can be understood and processed is cumbersome and technically complicated. Additionally, the NLP of complex natural text may become more complicated and prone to errors when ML classifiers and text processors require slight variations of mostly the same input since they can only perform accurately when they receive exactly the same type of processed input for prediction as the processed input for which they were trained.

Accordingly, a technical problem with the currently available natural language processing systems is that they may be inefficient, inaccurate, and/or not scalable to large semantic models and large teams of developers.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
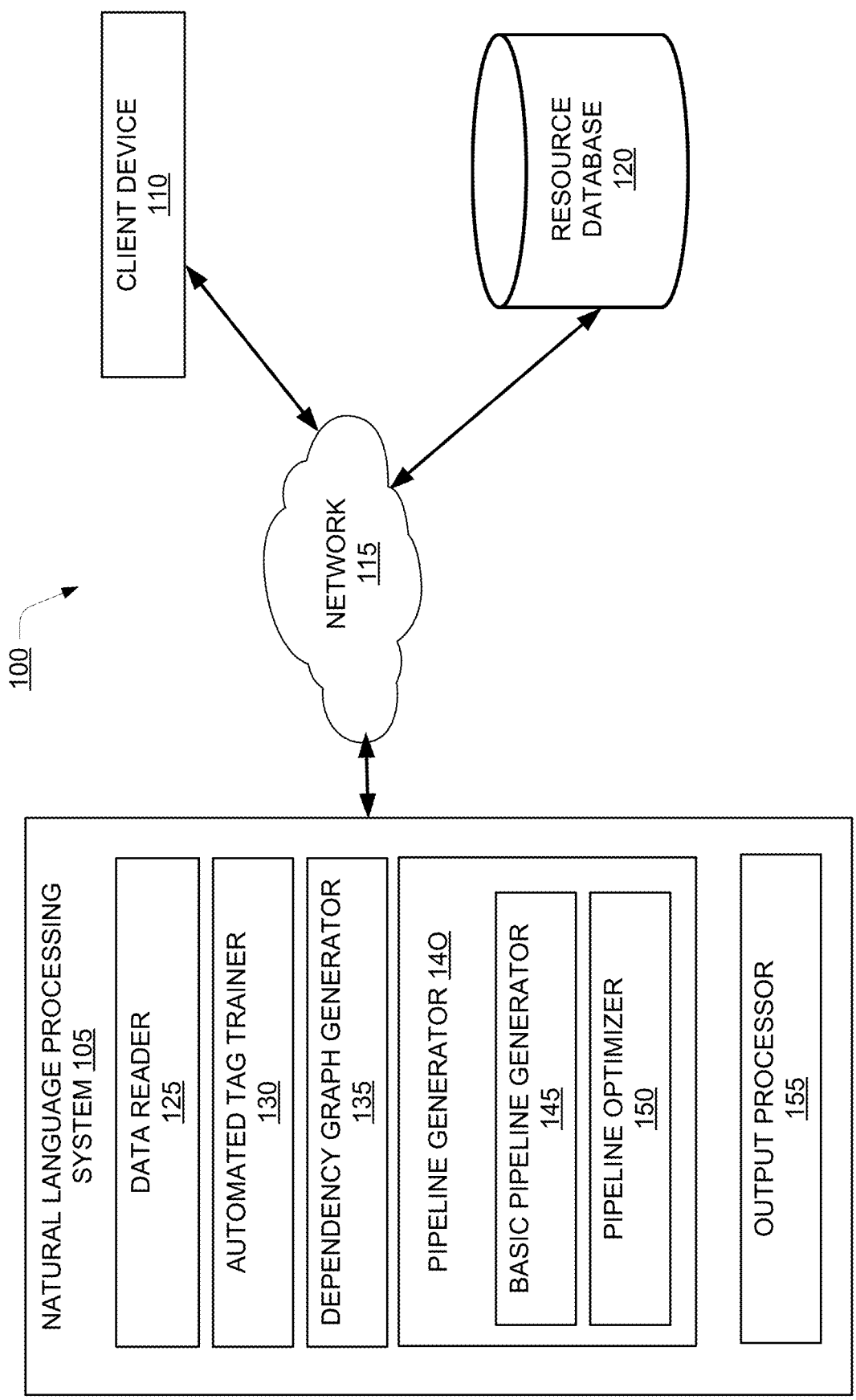
FIG. 1 illustrates a network environment implementing a natural language processing (NLP) system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present subject matter describes systems and methods for natural language processing. In an example, a natural language may be understood as a human language that a user uses to interact with systems. In an alternative example, natural language may be understood as a language, which is captured in a document or file, such as a word document or an audio file.

The disclosed embodiments illustrate methods and system for natural language processing, based on a pipeline generated for performing operations pertaining to the natural language processing. A pipeline may include a series of operations, which may be executed to perform natural language processing, for instance, to produce one or more tags, such as semantic tags and syntactic tags. For example, the pipeline may include fetching text followed by splitting of sentences, which in turn may be followed by one or more operations, such as feature extraction and classification. Upon execution of the pipeline, the semantic and/or syntactic tags may be generated, which may then be used to provide an interpretation to a text or provide an output to a user query involving natural language processing. The semantic and/or syntactic tags may represent an understanding of the corresponding natural language content. Examples of semantic tags include a person tag, a place tag, a food tag, a company tag, a product tag, and/or a person-product-preference tag. Examples of syntactic tags include a noun tag, a verb tag, an active object tag and a passive object tag.

According to an aspect of the present disclosure, the pipeline may be created using semantic and syntactic tags organized into a graph based on their dependencies, such a graph being referred to as a dependency graph. On receiving the request, a dependency graph may be generated by determining the dependees, and dependees of dependees of the requested tags, where a "dependee" tag is a tag or a natural language operation upon which a "depender" tag depends. The dependencies may be organized in a hierarchical order, for instance a tree structure or a directed network graph, based on their dependency relationships. In a dependency graph, processing, which may include resources required to provide a necessary input for a natural language operation, such as entity extraction, relationship extraction, classification, etc. to generate a tag, are specified as dependencies. Dependencies can further have their own dependencies, creating a dependency tree or a directed network graph of processing operations. The operations may be, for example, treated as data (nodes) in the dependency graph and the dependency relationships may be treated as links in the graph.

Thus, a dependency graph may be generated based on identified dependents and the further dependents. The dependency graph may include the natural language processing operations, corresponding dependents, and corresponding further dependents arranged in an order of and linked by their dependency relationships.

For instance, a user may provide an input to provide sentences in a well drilling report where drilling mud is lost. In such a case, the natural language processing to obtain the desired result may depend on having text tagged with {volume-measurement}, which in turn, depends on having content tagged with {number} and {unit}, which, again in turn, depends on having text processed with basic tokenization and then converted to lower case. In said example, {volume-measurement}, {number}, and {unit} represent the tags to be generated. Accordingly, such processing and resources for natural language processing, such as {volume-measurement}, {number}, {unit}, basic tokenization and conversion to lower case etc., may be identified as dependencies for generating the dependency graph.

In an example, a request to process an input for natural language processing to generate one or more semantic tags may be received. The dependencies between the tags, for instance, may be defined manually as the natural language processing operations are created. Upon receiving the request, a dependency graph indicating dependencies of operations to be performed and dependencies of those dependencies and so on for the natural language processing may be generated. Further, the graph may also indicate the dependencies and corresponding operations in a hierarchical order, for instance, in a bottom first approach, where an operation at the bottom of the dependency graph may be performed first followed by its dependers and so forth.

Alternatively, the graph could indicate dependences as an acyclic directed network graph, where each depender indicates the dependees upon which it depends (or vice-versa). The depth of the graph can be to any level, that is, there may be dependers on dependers on dependers to any level of nesting.

In an example, each operation used to process natural language content is configured to indicate the dependencies it contains. As an example, a machine learning classifier for "{computer-instruction}" might identify the tags, which should be normalized before classification is performed. It may be that converting all numbers to the tag "{number}", all email addresses to the tag "{email}" and all URLs to the tag "{url}" and then classifying on those tags with the tokens that remain will provide a more accurate classifier. In this example, the machine learning classifier for "{computer-instruction}" will depend on the processing for "{number}", "{email}" and "{url}" to be accurate and complete before training and/or prediction can occur.

In another example, a resource database may include a database of patterns, where processing of a tag may be dependent on processing of other tags. For instance, the processing for the tag {person-product-reference} may be depend on the processing for the {name} and {product} tags. Based on the dependency graph, a pipeline is automatically generated. The pipeline may include the operations in an order according to the dependency graph so that dependee operations will be completed before any of their depender operations. In other words, operations, which appear at the bottom of the dependency graph, may be executed before operations higher in the graph. Thus, the pipeline may include operations in an order such that the operations are processed first before their dependers, i.e., from the bottom of the dependency graph to top. Further, such a pipeline may include a minimum number of operations required to meet the requested semantic understanding requirements by only including the required dependencies according to the dependency graph. In this way, the pipeline will be constructed as to minimize the amount of computing resources and to maximize the performance for generating the requested semantic understanding.

In an example, executing the pipeline may include causing a depender tag to use an output of a dependee tag to determine if the dependee tag needs to be generated or not. For example, a depender tag for a depender operation may be generated based on the existence of a dependee tag generated by a previously executed dependee operation. In this case, the existence of the dependee tag may be ascertained based on a confidence score associated with the dependee tag. In this manner, dependee-depender tags may define and implement fallback mechanisms, which are executed if other more accurate but less comprehensive mechanisms fail to produce results.

In an example embodiment, the pipeline is executed to, generate depender tags using a depender operation. A depender tag for a depender operation may be generated based on an existence of a dependee tag generated by a previously executed dependee operation. In an example, the existence of the dependee tag may be a function of the dependee tag's confidence score. Furthermore, a confidence score associated with the dependee tag may be determined based on the tagged output of the dependee tag, and the existence of the dependee tag may be ascertained, based on the confidence score. When it is ascertained that the dependee tag exists, the execution of the depender operation is skipped, and when it is ascertained that the dependee tag does not exist, the depender operation is executed to allow the depender tag to act as a fallback to the dependee tag. In an example, confidence scores of depender tags produced by the depender operations are modified, based on the existence of the dependee tags.

In an example, once the first pipeline is generated, it may be modified or optimized to generate a second pipeline for scalability, reduce redundancy, and to reduce processing time. In an example, potentially mergeable operations in the pipeline may be identified and merged. An operation may be considered mergeable if it has an identical or a sufficiently similar function as another operation, or it is the same function but with different but mergeable configuration or supporting resource data, or if it contains identical or sufficiently similar sub-processing components that can be combined for efficiency. In an example implementation, the mergeable operations may be shifted upwards or backwards in the pipeline until they are co-located with another operation it can be merged with. Further, the operations may be shifted for merging such that no depender is computed before any of its dependees (or dependees of dependees and further dependees as indicated by the dependency graph). Accordingly, one or more co-located mergeable operations may be merged to modify the pipeline to create a pipeline which has fewer operations and is therefore more efficient. Further, if a same dependency is required by multiple operations or stages, only a single instance of the operation (or corresponding executer) which produces that dependency may be included in the pipeline. The second pipeline may then be used to process the natural language text in the input.

In other example implementations, operations may be merged without requiring that operations be first shifted and co-located in the pipeline. Further, in other examples, instead of creating two pipelines, a first "initial pipeline" and then a second "optimized pipeline" with merged operations based on the dependency graph, the optimized pipeline may be created using the dependency graph from the very beginning. In said approach, the operations are merged as they are added to the initial pipeline as long as merging would not cause any depender operation to be executed before its associated dependee operations upon which it depends.

The present disclosure provides for computing resource efficient, reliable, scalable, and accurate systems and methods for natural language processing. For instance, a pipeline that may have n number of operations traditionally may now include a maximum of n−x/2 operations, x being number of mergeable operations, thereby reducing the processing time for the input without compromising on accuracy or completeness. Note that in an example implementation, more than two operations may be merged together into a single operation. In an example implementation, more than two dictionary-based entity extraction modules may be merged together into a single dictionary-based entity extraction module with all of the dictionary entries for all modules merged together. Since, in the example implementation, the dictionary-based entity extraction is based on hash-table lookups which are O(1) run time, one can see that merging three such operations and combining their dictionaries into a single large dictionary will reduce run time from O(3) to O(1).

The present disclosure also provides for a computing resource efficient, reliable, scalable and accurate system for retraining and retesting of semantic models, including machine learning models, with multiple natural language operations including shared operations. Since the system understands semantic dependency, i.e. how semantic processing is shared across natural language operations and what semantic understanding depends on other operations, the system can identify the minimum number of natural language operations that will need to be retrained, re-tested, and re-evaluated for any change made to any natural language operation in the system. The system can further perform these functions in an appropriate order to ensure that shared operations that provide shared semantic understanding are retrained and retested before operations which depend upon them. Thus, as against traditional systems, which require continual and on-going manual intervention to retrain and retest parts of the system, or simply retrain and retest everything multiple times, the present system is resource (computer and manual) and time efficient.

Additionally, the present disclosure allows for creating larger and more complex natural language systems with richer and more diverse methods for semantic understanding. The creation of such system is facilitated by eliminating much of the manual labor required to create and maintain natural language pipelines for a large variety of needs, including training, prediction, testing, for each semantic understanding and various combinations of semantic understanding, by many distributed systems. The manual intervention is minimized by providing a system to automatically construct pipelines on demand as needed and to automatically retrain and retest natural language operations as needed.

The present disclosure also reduces computing resources required for constructing pipelines as needed to meet the minimum requirements needed to handle requested semantic understandings as compared to traditional systems where the same pipeline is used for everything. Further, the pipelines can be further automatically optimized to combine mergeable operations and create more efficient pipelines, again on-demand as needed. Such automation eliminates manual effort required to optimize pipelines and ensures that pipelines are created correctly such that all dependers are computed after the dependee operations are computed upon which they depend, and creates pipelines which use the minimum available computing resource for any desired semantic interpretation or purpose.

Further, the present disclosure reduces manual labor for managing training, retraining, testing and retesting of natural language operations as changes are made. The present disclosure does so by understanding what depender operations need to be retrained and retested whenever a change is made to a dependee natural language operation, which produces a natural language understanding. It further reduces manual labor by understanding exactly what order operations may need to be retrained and retested, eliminating the need for users, such as developers to determine the order of the operations to be retrained/retested and implement this manually for each and every natural language processing system.

The present disclosure further reduces computing resources required for training by identifying the minimum number of operations, which will need to be retrained and retested for any change. This may be done by understanding exactly what dependers are for each dependee, and training only those natural language processing operations that are affected by the change, and no more. The system further reduces computing resources by ensuring that shared operations are only retrained and retested once, rather than multiple times for each depender operation.

The present disclosure enhances performance by allowing for retraining and retesting to be performed simultaneously across parallel computing resources. It does this by identifying what natural language operations can be safely retrained at the same time, those operations being ones which do not depend on each other, either directly or indirectly as indicated through the interpretation graph.

Thus, new natural language processing systems may be created more quickly and with fewer human resources required. Further, larger and more complex natural language processing systems may be created without incurring exponentially increasing human labor. Further, the natural processing systems created will be able to process data faster by always producing pipelines, which meet the minimal requirements to provide the needed semantic understanding requested by client applications. Further, the natural language processing systems will be able to process data faster by intelligently combining mergeable operations to faster and more efficiently deliver the required accuracy and semantic understanding. Further, required maintenance of the natural language processing system can be reduced by identifying and automatically performing the minimum amount of retraining and retesting required for any change to the system, and further such retraining and retesting can be performed in parallel, where possible.

Thus, the present disclosure provides methods for automating the construction of complex natural language processing systems with shared operations. As described above shows how these pipelines can be constructed accurately and automatically on demand for any size semantic model with any amount of sharing of semantic processing across natural language operations such that the result will create a pipeline where all depender operations are computed only after all associated dependee operations are computed upon which the depender depends have been computed.

FIG. 1 illustrates a network environment 100 implementing a natural language processing system 105, hereinafter referred to as system 105, according to an example embodiment of the present disclosure. In an example embodiment, the system 105 processes a natural language, which a user uses to interact with the system 105, in order to understand the context of the natural language. In an example, the natural language refers to a human language such as English, Chinese, Russian, German, French, Japanese, and the like as opposed to a machine language. The natural language may be a written language or a spoken language. The description hereinafter is explained with reference to the English language for the purpose of explanation and should not be construed as a limitation. One of ordinary skill in the art will appreciate that any natural language may be processed by the system 105.

In an example embodiment, the network environment 100 may be a public network environment, including thousands of individual computers, laptops, various servers, such as blade servers, and other computing devices. In another example embodiment, the network environment 100 may be a private network environment with a limited number of computing devices, such as individual computers, servers, and laptops. Furthermore, the system 105 may be implemented in a variety of computing systems, such as a laptop, a desktop, a tablet, and the like.

According to an example embodiment, the system 105 is communicatively coupled with a client device 110 through a network 115, such that the user of the client device 110 can interact with the system 105. Although, it is shown that the client device 110 is communicatively coupled with the system 105 through the network 115, the client device 110 may be communicatively coupled with the system 105 through one or more communication links, other than the network 115.

In an example embodiment, the network 115 may be a wireless network, a wired network, or a combination thereof. The network 115 may also be an individual network or a collection of many such individual networks, interconnected with each other and functioning as a single large network, e.g. the Internet or an intranet. The network 115 may be implemented as one of the different types of networks, such as intranet, local area network (LAN), wide area network (WAN), the internet, and the like. Further, the network 115 may include a variety of network devices, including routers, bridges, servers, computing devices, storage devices, and the like.

Further, the system 105 is further communicatively coupled with a resource database 120 through the network 115. The resource database 120 may contain any resource required by the natural language processing system or the natural language operations it contains, including indexed databases, patterns, dictionaries, thesauri, word embeddings, machine learning models, and the like.

In an example, the resources in the resource database 120 may be provided to the system 105 using any appropriate database, index or storage technology. In an example implementation, resources are stored in files, No-SQL databases, SQL-Databases, and in a search engine.

Further, the resources in the resource database 120 may be separated by semantic or syntactic tag. This allows the system 105 to identify exactly which resources are required by the natural language operations required to implement each tag. In an example, resources are labelled with the name of semantic or syntactic tag to identify them amongst other resources. In an example, the semantic or syntactic tag is used to identify folders, databases, indexes or directories in the resources database. In another example, the semantic or syntactic tag is used to label individual lines or records within a single file, database or index.

In an example, the resource database 120 includes pipeline configurations, dictionaries, pattern data, machine learning models, and the like. In said example, the dictionaries may include pattern databases. Pattern databases may be understood as lists of JavaScript Object Notation (JSON) records, indexed by pattern and identified by semantic or syntactic tag. Each JSON record represents a pattern which can be used to understand a sequence of natural language items with syntactic or semantic understanding. Further, the pattern data includes a list of patterns and a semantic tag associated to each pattern. In other words, the pattern data includes the pattern and the resulting semantic tag that is produced when the pattern is matched. The resource database 120 may identify the tags upon which the natural language processing depends and as an example, an "advanced pattern" recognizer may contain a database of patterns as shown below:

| PATTERN | SEMANTIC TAG |
| --- | --- |
| {name} likes {product} | {person-product-preference} |
| {product} {number} | {product} |
| the {product} | {product} |
| {name} thinks {product} is wonderful | {person-product-preference} |

In this example, the processing for the tag {person-product-reference} will depend on the processing for the {name} and {product} tags. The underlying tags may be implemented using any natural language processing method, including machine learning or pattern recognition. In this way, the patterns in the database will determine how natural language operations depend upon each other.

Further, the resource database 120 may be accessed by the system 105 for language processing. Furthermore, the resource database 120 may be periodically updated. For example, new data may be added into the resource database 120, existing data in the resource database 120 may be modified, or non-useful data may be deleted from the resource database 120. Although, the resource database 120 is shown external to the system 105, it would be appreciated by a person skilled in the art that the resource database 120 may be implemented internal to the system 105.

In addition the resource database 120, the system 105 may also be coupled to a document database (not shown in figures). The document database may be used to provide natural language content to system 105. This natural language content may be used by system 105 for training data, testing data, or to provide natural language input for the client device. Training data and testing data may be required by system 105 to implement automated retraining and retesting as natural language operations are modified.

According to an example embodiment, the system 105 may include a data reader 125, an automated tag trainer 130, a dependency graph generator 135, and a pipeline generator 140, which includes a first pipeline generator 145 and a pipeline modifier 150, an output processor 155, and a natural language processor (not shown in figures) in communication with each other to perform the functionalities of the system 105. The natural language processor includes natural language processing operations to tag the input data with the tags to indicate content understanding. The natural language processing operations include depender operations and dependee operations, and wherein the depender operation requires tagged output of the dependee operations.

In an example embodiment, the data reader 125 of the system 105 may receive an input from a user of the client device 110 to produce one or more semantic or syntactic tags. Examples of semantic tags may include, but are not limited to, a person tag, a place tag, a food tag, a company tag, a product tag, and a person-product-preference tag. Examples of syntactic tags include a noun tag, a verb tag, an active object tag and a passive object tag. Semantic and syntactic tags may also be representative of specific content understanding only appropriate for highly specialized domains, such as an oil and gas drilling equipment tag, a pressure test tag, a troubleshooting procedure tag, a legal contract assignment tag, or similar.

The data reader 125 may function in a pipeline or in parallel to other components. In an example, the input indicative of human generated natural language content may be a real-time input from a user, may be an input from voice recognition software, and/or may be a previously authored input from an author stored onto an electronic document. The input may be indicative of a data stream. In an example, the data stream comprises raw text indicative of a natural language. Upon receiving the data stream, the data reader 125 may read data from the data stream.

Further, the data stream may include instructions from the client device on what semantic and syntactic understanding is required from the natural language processing system 105. Requested semantic and syntactic understanding may be provided as a list of semantic and/or syntactic tags. These instructions may guide the pipeline generated to determine what pipeline should be created to optimally produce the requested semantic and/or syntactic understanding to be performed on the natural language input.

The pipeline in which the data reader 125 may be executed may be generated and retrained using components executed an automated tag trainer 130, a dependency graph generator 135, and/or a pipeline generator 140.

The instructions on what semantic and/or syntactic understanding is required may be provided to the dependency graph generator 135. The dependency graph generator 135 may identify operations to be performed for providing a required output and the dependencies of the operations using predefined trained data and/or resource database 120. For instance, a user may request to identify all sentences in a well drilling report where drilling mud is lost, and the well drilling report may be provided as the input to be processed and interpreted.

Based on the input data and the user request, the operations to be performed may be identified, for instance, fetching data, splitting sentences, fragmentation, ML classifiers, ML extractors, etc. Further, dependencies of each of the operations may be identified and the operations along with their dependencies may be represented in a tree structure, an example of which is shown in FIG. 2c. In the dependency graph, processing and resources required to provide the necessary input for performing the identified operations are specified as dependencies. In the example, determining amount of mud loss depends on text in the well drilling report being tagged as {volume-measurement}.

The first pipeline generator 145 of the pipeline generator 140 may parse through the dependency graph to generate a first pipeline including the instructions to be executed to achieve the output indicated in the user request. For example, if the dependency graph indicates n operations, the first pipeline may include the n operations in a predefined order. The predefined order, in an example, may be to add an operation occurring at the bottom of the dependency graph first in the first pipeline and/or as long as an operation occurs before all of the operations which depend upon it. In an example, an operation that is not dependent on the output of any other operation may be provided first in the pipeline and then the operation that may have dependency on a resource/output of the first operation or any prior operation and so forth.

Upon generating the first pipeline, the pipeline modifier 145 modifies the first pipeline, based on the dependency graph. In an example, the pipeline modifier 145 may re-order the operations in the first pipeline to co-locate the mergeable operations. The reordering may be performed such that depender operations are free to move up the pipeline as long as they are not moved before any dependee operation that they depend upon from the dependency graph.

Accordingly, an intermediate pipeline may be generated, which may include the mergeable operations located next to each other. The mergeable operations may then be collapsed or merged in a single operation to generate a second pipeline as explained in detail with reference to FIG. 2a-FIG. 2f. The second pipeline may be specified, for instance, in a JSON format.

One of ordinary skill in the art will appreciate that the same functionality provided by the second pipeline may also be produced in a single step when generating the first pipeline. This would involve checking for mergeable operations as the first pipeline is being generated, merging them, and then constructing the first pipeline from the merged operations where available.

The final pipeline may then be executed by a pipeline executor (the functionality of which is explained with reference to, for example, block 612 in FIG. 6 below) of the output processor 155 to provide an output corresponding to the user request. The output processor 155 may provide the generated semantic and/or syntactic understanding as tags for further use and/or execute the operations or corresponding modules as they occur in the pipeline to provide the output. For instance, the data reader 125 may perform the gathering of text and splitting of sentences, a tokenizer may perform tokenization, a tagger may associate semantic or syntactic tags, and a classifier may perform ML classification to provide the desired output.

In an example, the pipeline executor may generate a depender tag for a depender operation, based on an existence of a dependee tag generated by a previously executed dependee operation. The existence of the dependee tag may be checked based on a corresponding confidence score. A confidence score for the dependee tag may be determined and compared with a threshold confidence score to ascertain presence or absence of the dependee tag. The dependee tags with the confidence scores below the threshold confidence score may be considered to not exist, i.e., considered to be absent; while the dependee tags having the confidence score above or equal to the threshold confidence score may be considered to exist, i.e., present.

The pipeline executor may determine a confidence score associated with the depender tag. For instance, the depender tag may use the tagged output of the dependee tag to determine a level of confidence associated with the dependee tag. This could occur when the depender and the dependee tags tag two different sections, which are in the same sentence, but where the mere presence of one helps to improve the confidence of the other. For example, in the sentence "His name is Moon Unit", two tags may be identified: specifically {name-indicator} and {name}, and so the sentence may be tagged as "{name-indicator:His name} is {name:Moon Unit}". In this example, the "name-indicator" tag may be a dependee to a "name tag" which is a depender. The presence of the "name-indicator" tag (in the above example, the phrase "his name") would increase the confidence that "Moon Unit" (tagged by the "name" tag) is, in fact, a person name rather than the name of something else. The depender tags may depend on the execution of the technique associated with the dependee tag, and not the actual creation of the dependee tag. In the above example, the {name} tag depends on {name-indicator} having executed ahead of time and may still execute even if there is no {name-indicator} tagged in the sentence. The fact that {name-indicator} technique executed and did not tag anything is, by itself, useful information which reduces the confidence of the {name} tag itself, and the converse is also true).

A high confidence score, i.e., greater than the threshold confidence score, may indicate that the dependee tag provides an accurate representation of the tag which the depender tag would have created, and therefore, such presence of the dependee tag may cause the depender operation to skip execution of the depender tag, i.e., generation of the depender tag. While, absence of the dependee tag, i.e., the dependee tags with low confidence scores, causes the depender operation to not skip execution (when it otherwise would), because the depender tag acts as a fallback to the dependee tag.

Further, based on the presence or absence of the dependee tag, the confidence scores of the depender tags that the depender operation produces may be modified.

For example, there may be two different mechanism or techniques to tag a sequence of tokens as "person-name" and these tokens may be tagged as "person-name-1" and "person-name-2". In this case, assume "person-name-2" depends on "person-name-1". The person-name-2 tag may decide to skip performing additional operations to identify a person name if "person-name-1" has already made that determination with high confidence, such as a confidence greater than a threshold confidence. In an example, "person-name-1" tag may be performed with a dictionary lookup method for known good names (for example, known employee names from a company's employee directory) and may look for the presence of both the first and last name. Such a technique may be precise in that when it finds a match, as the quality of that match is very likely to be accurate (e.g. near to 100%), but it may also provide poor coverage, in that, for example, it may miss examples where names are misspelled, modified, abbreviated, contain nick-names, etc. Therefore, in an example embodiment, the "person-name-1" match finding technique follows with a more flexible, but less accurate "person-name-2" technique, which could be a Neural-Network trained name recognizer.

Such a recognizer may have a better coverage (e.g. identify more matches) but also less precision (some of the names it produces may not be names at all). Further, person-name-2 may be expensive, for example, a Neural Network with, potentially, millions of calculations required. In this example implementation, a dependency connection between "person-name-1" and "person-name-2" would be appropriate. If a match is produced by "person-name-1", this will be very likely to be a person name and will have very high confidence, and so there will be no need to apply a less-accurate, much more expensive technique (person-name-2) to the same text. However, if person-name-1 does not produce a match, then person-name-2 could be deployed to catch additional variations (at lower quality) that might be missed by person-name-2.

In this manner, dependee-depender tags may define and implement fallback mechanisms, which are executed if, other predetermined mechanisms, such as more accurate and less comprehensive techniques fail to produce results.

In an example, the operations may be pre-defined and trained to cater to a wide variety of scenarios. For instance, the automated tag trainer 130 may retrain semantic or syntactic tags generated, when such semantic or syntactic tags are updated as explained in detail with reference to FIGS. 3 and 7. The automatic tag trainer may store at least one of test data, training data, the machine learning model, and quality evaluation data separately for each tag.

Thus, the present disclosure provides for generation of pipelines for producing required semantic or syntactic tags to perform efficient natural language processing of a given input. Referring to the example of the user request for determining mud loss from a well drilling report, machine learning classifiers can be created to perform the required analysis. Furthermore, to ensure that the ML classifiers work well and efficiently, a variety of volume measurements, such as "1.0 k bbls", "10,000 gallons", etc. are reduced to a single entry/tag called "{volume-measurement}". This technique provides a cleaner, more targeted input to the machine learning algorithm, thereby reducing a very wide range of possibilities (e.g. all possible numeric volumes) into a single dependable tag, "{volume-measurement}". This reduction in data variety to be processed will allow the ML classifiers to operate much more effectively, thereby creating a more accurate model with fewer training examples. Further, the "{volume-measurement}" tag itself may come from an ML classifier or extractor and it may further depend on numbers such as "1.0" and "10,000" to have been previously identified to make the classifier more accurate.

In an aspect of the disclosure, the creation of the pipeline based on the dependency graph may be coupled with re-training and re-testing (also known as regression testing) of the natural language operations used to provide semantic understanding. Further, the dependency graph can be used to determine which natural language operations may need to be retrained and retested and how to parallelize the retraining and retesting.

In an example, changes to a natural language operation associated with a semantic or syntactic tag are known to the system. Such changes may include changes to the source code used to implement the operation, changes to the configuration or changes to any of the data resources used by the operation, data resources to include pattern databases, training data, user examples, user corrections to past predictions, etc. Changes to natural language operations may be determined by consulting log files, through a queue or stream of notifications, by consulting file dates, by consulting time stamps, etc.

Once a change to a natural language operation associated to a semantic or syntactic tag is known, the dependency graph may be consulted to identify depender syntactic or semantic tags which depend on the changed tag, and those which depend on the dependers and so on to any level, to identify all of the natural language operations which need to be retrained and retested. Thus, the dependency graph may be used to identify the complete set of semantic and syntactic tags that need to be retrained and retested.

Further, the dependency graph may be used to determine the order in which semantic and syntactic tags are retrained. Assuming that the complete set of semantic tags that need to be retrained and retested is labeled SET_X, retraining may proceed with first retraining and retesting the changed tag. After retraining and retesting the tag may be considered "up to date". Subsequently, retraining and retesting any tag from SET_X which, according to the dependency graph, depends only on the changed tag and any other tag not in SET_X. After retraining and retesting these tags are now "up to date". Thereafter, retraining and retesting any tag from SET_X which has not yet been retrained and tested and which depends according to the dependency graph, only on any tag which is not in SET_X and any other tag which is "up to date". After retraining and retesting these tags are now be "up to date" and continuing until all tags in SET_X are retrained and retested.

Further, the dependency graph can be used to determine how retraining and retesting may be parallelized. If, during retraining and retesting, there is a set of more than one tag which depends only on tags which are "up to date", or tags which are not in SET_X, then these tags may be retrained and retested simultaneously across multiple computer resources. Since retraining of machine learning models are often expensive operations possibly requiring hours, days or even months of computer time, such optimizations may result in substantial savings of computer resources and execution time.

Retraining and retesting described in the previous paragraphs may include any of retraining machine learning models, evaluating the accuracy of the updated natural language understanding operations against test data, and determining if the accuracy is sufficient to have a properly functioning system (and raising an error if it is not).

Figure 2A:
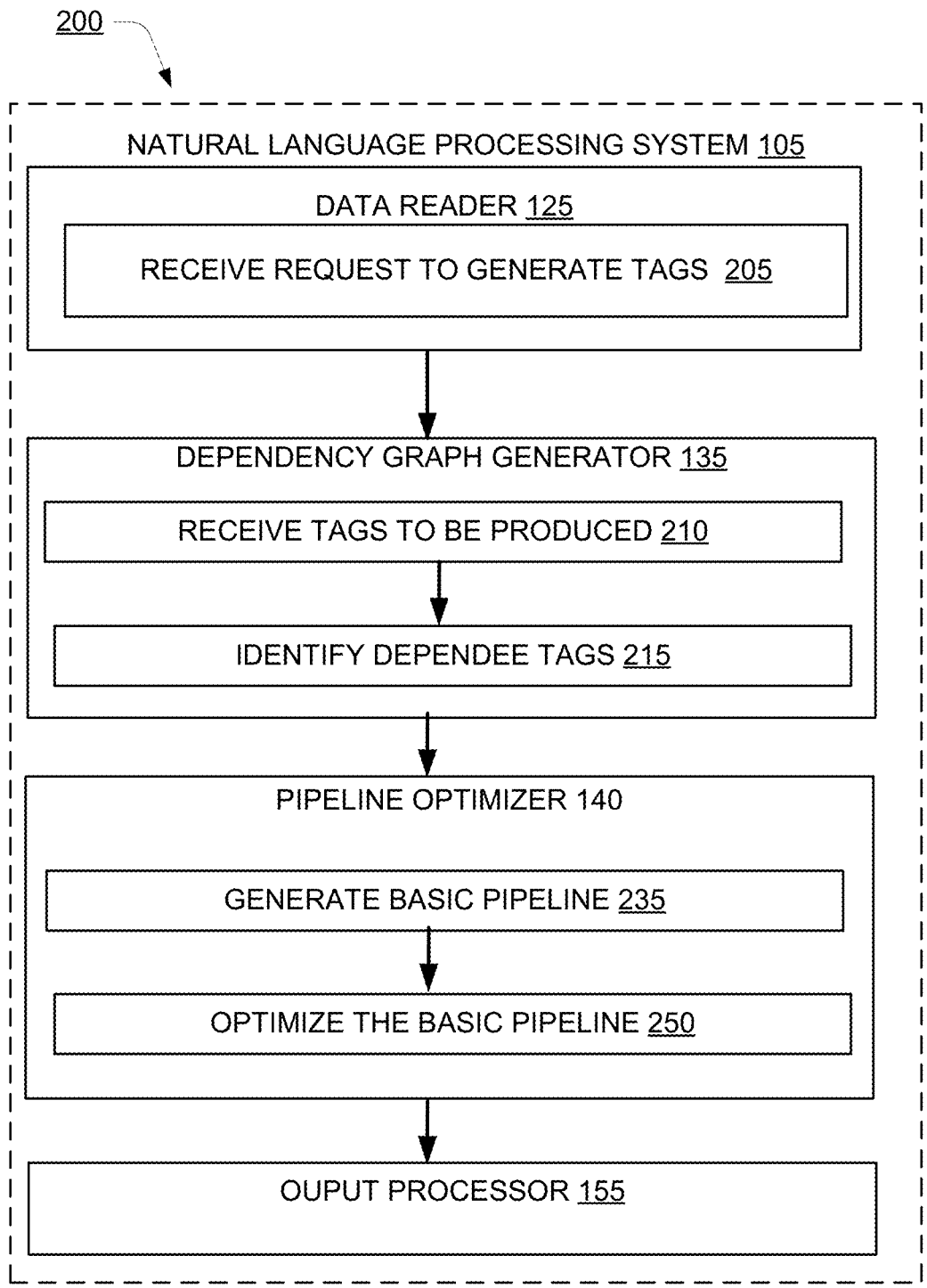
FIG. 2a illustrates a block diagram of the NLP system, according to an example embodiment of the present disclosure.
Figure 2B:
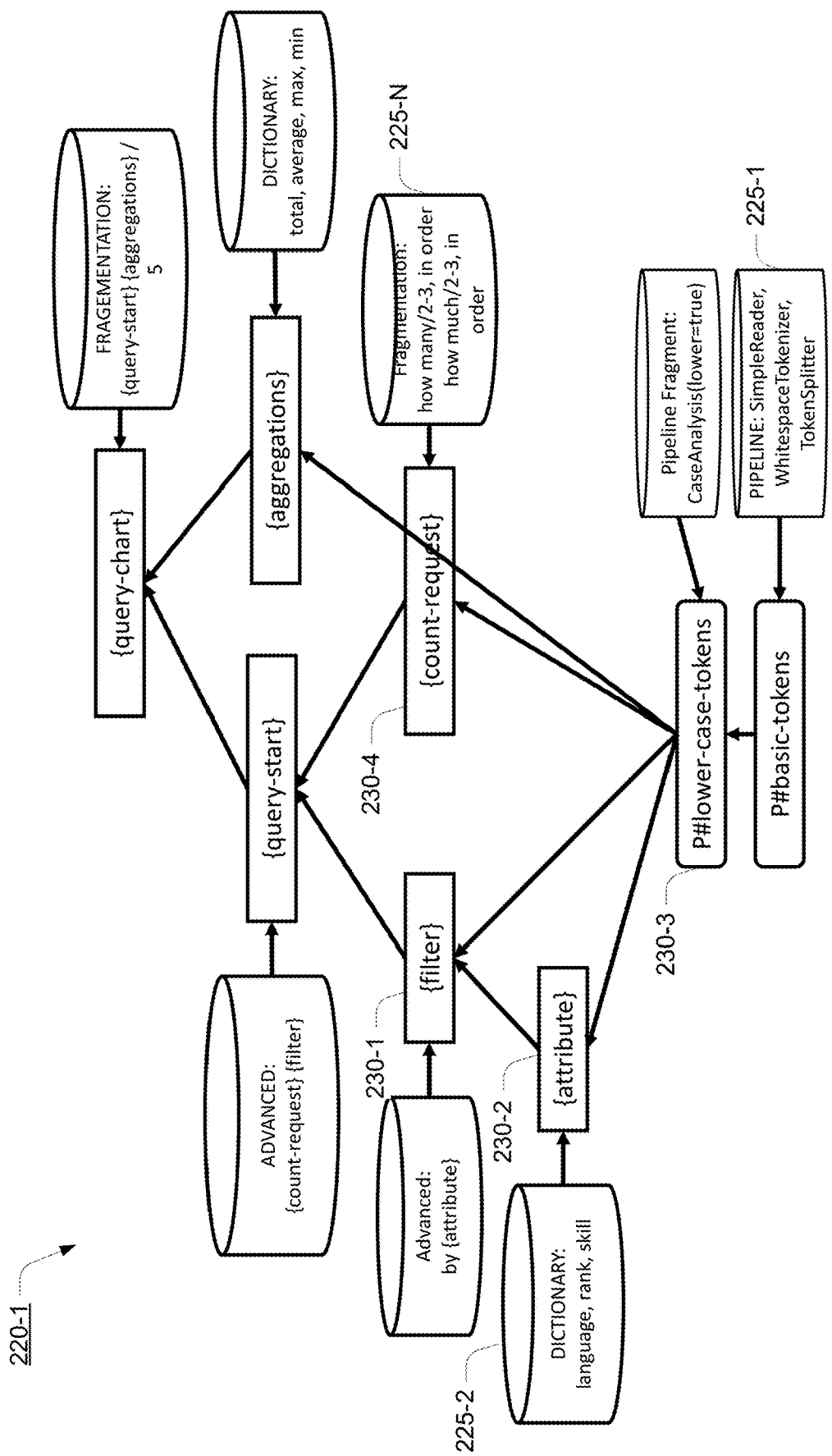
FIGS. 2b-2f illustrate various stages of NLP executed by the NLP system, according to an example embodiment of the present disclosure.
Figure 2C:
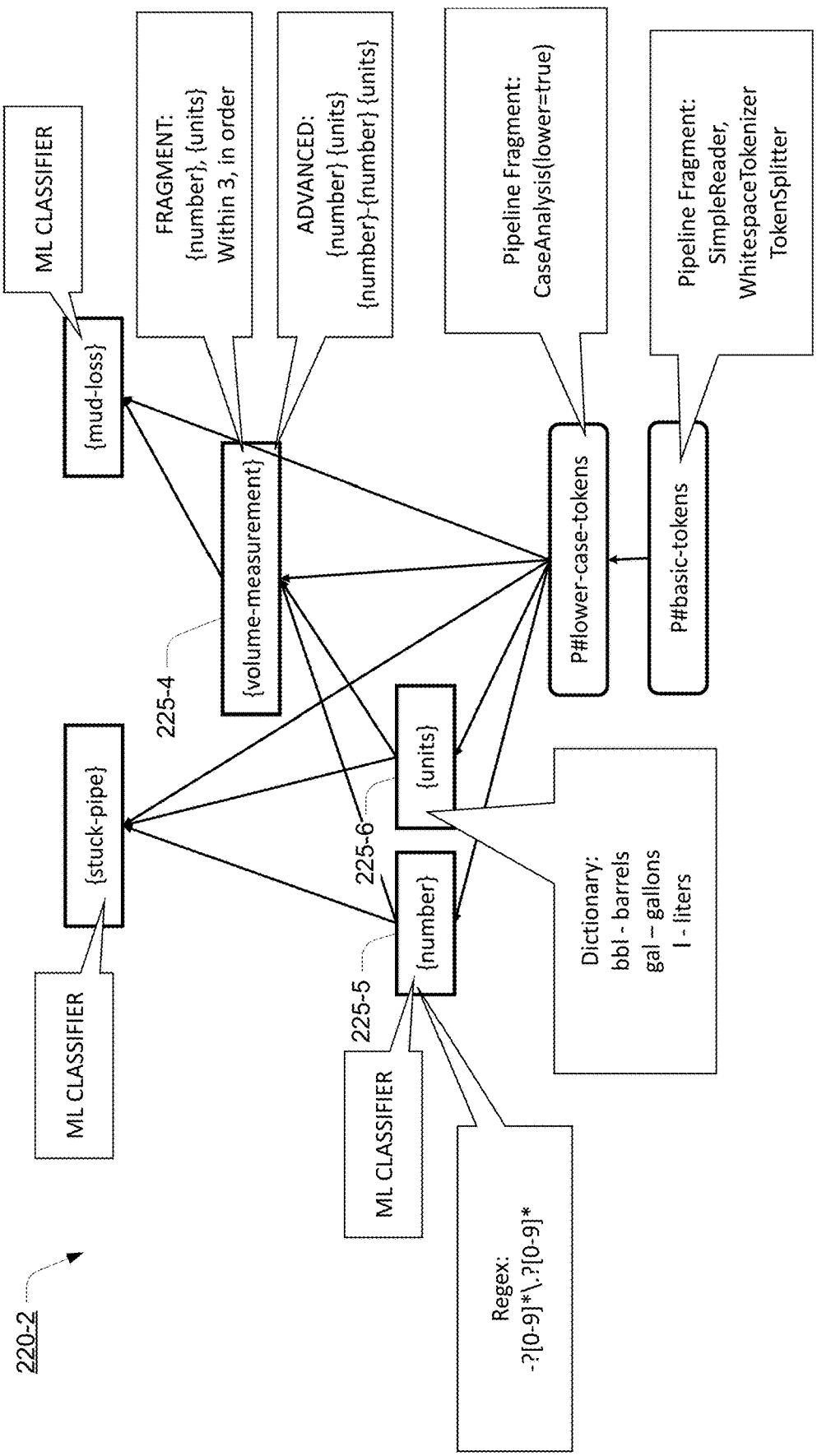

FIG. 2a illustrates a block diagram 200 corresponding to the pipeline generation function of the system 105, according to an example embodiment of the present disclosure. Further, FIG. 2b and FIG. 2c illustrates examples of dependency graphs.

Referring to FIG. 2a, as illustrated, the data reader 125 may receive an input for natural language processing of input data to generate semantic and/or syntactic tags, as illustrated at block 205. The data reader 125 may receive both the input data as well as the request for what semantic and/or syntactic tags are to be generated. In an example, a user may determine the tags to be generated.

The data reader 125 may provide the input to the dependency graph generator 135 to generate a dependency graph, based on which a pipeline may be generated. As illustrated at block 210, the dependency graph generator 135 may receive a request for tags, semantic and/or syntactic, to be produced. At block 215, the dependency graph generator 135 may identify the dependee semantic tags upon which processing depends. Dependee semantic or syntactic tags are specified with the natural language operations associated with each semantic or syntactic tag. According to one example, dependee semantic and/or syntactic tags are specified in configuration for the natural language operation as a list of tags to produce before performing machine learning classification. In another example, dependee semantic or syntactic tags are specified in a pattern database, where the tags may be parts of patterns that produce needed semantic or syntactic tags to satisfy the input request. In another example, dependees may not be semantic or syntactic tags, but instead may be pipeline fragments, that is, sequences of operations, that provide necessary up-front text and natural language processing of the input necessary to for the requested semantic and/or syntactic tags.

Based on the identified dependant semantic and syntactic tags, the dependency graph generator 135 may generate the dependency graph indicating the operations to be performed as corresponding dependencies. Further, the dependency graph generator 105 may also manage common, required low-level text and natural language processing such as tokenization, lemmatization, token normalization and the like. These common, low-level text and natural language processing operations may also be specified in the dependency graph. In the example shown in FIG. 2b, "basic-tokens" and "lower-case-tokens" are both examples of natural language pipeline fragments that provide this low-level text and natural language processing functionality. Any pipeline constructed from these items could be used by all dependent natural language processing processes.

An example dependency graph 220-1 is illustrated in FIG. 2b, which may be generated to provide answer to a query. In FIG. 2b, {query-chart}, {query-start}, {aggregation}, {filter}, {count-request}, and {attribute} are all examples of semantic tags, albeit specifically targeted to generating SQL queries from natural language text.

The components in cylinders with reference numerals in 225 series illustrate the operations that may be performed for natural language processing along with their associated configuration and resource data and the components in rectangles with reference numerals in 225 series correspond to semantic or syntactic tags. The arrows between the boxes indicate dependencies from one semantic or syntactic tag to another, where the arrow is pointing from the dependee to the depender, where the depender depends upon the output provided by the dependee. For instance, the block 225-1 illustrates operations simpleReader, whitespacetokenizer, and token splitter, the block 225-2 illustrate operation dictionaryextraction, based on language, rank, and skill, and the block 225-N illustrate a fragmentation parser.

Likewise, identifying the semantic tag "{filter}" at block 230-1 may be dependent on an attribute 230-2, the "{attribute}" tag, being tagged on the input using the dictionary 225-2, where the "{attribute}" tag 230-2 may in turn be dependent on the pipeline fragment which produces lower case tokens 230-3, which is, in turn, dependent on another pipeline fragment 225-1 which produces basic tokens.

FIG. 2c illustrates another example dependency graph 220-2, which is generated to determine mud loss by processing a well drilling report. The mud loss determination may depend on having text tagged with {volume-measurement} 225-4, which, in-turn, depends on having content tagged with {number} 225-5 and {unit} 225-6, which, in turn, depends on having text processed with basic tokenization and then converted to lower case. In FIG. 2c, {stuck-pipe}, {mud-loss}, {volume-measurement} 225-4, {number} 225-5, {units} 225-6 are all examples of semantic tags. In the figures, directed arrows are shown from each dependee to its associated depender.

Referring back to FIG. 2a, once the dependency graph 220 is generated, the pipeline generator 140 may generate the pipeline to be executed for providing an output corresponding to the user query. As illustrated, at block 235, a first pipeline may be generated, for instance, the first pipeline generator 145 may generate the first pipeline using the dependency graph 220. The operations in the dependency graph may be arranged in order to generate the first pipeline, where the operations producing an output on which another operation depends is provided before such other operation and so forth.

In an example, the operations which provide an output not required by the requested semantic tags may not be included in the pipeline, thus creating a simpler and more efficient pipeline than simply including all operations. As an example, if in FIG. 2b the "{query-start}" tag is the only tag requested, then the natural language operations for "{aggregations}" and "{query-chart}" may not be included in the pipeline, thus improving the performance of the pipeline to generate only the requested output. Such an output might be required for the "{query-start}" tag to, as an example, regression test the tag to determine how well the patterns match pre-tagged or manually tagged sample data.

Figure 2D:
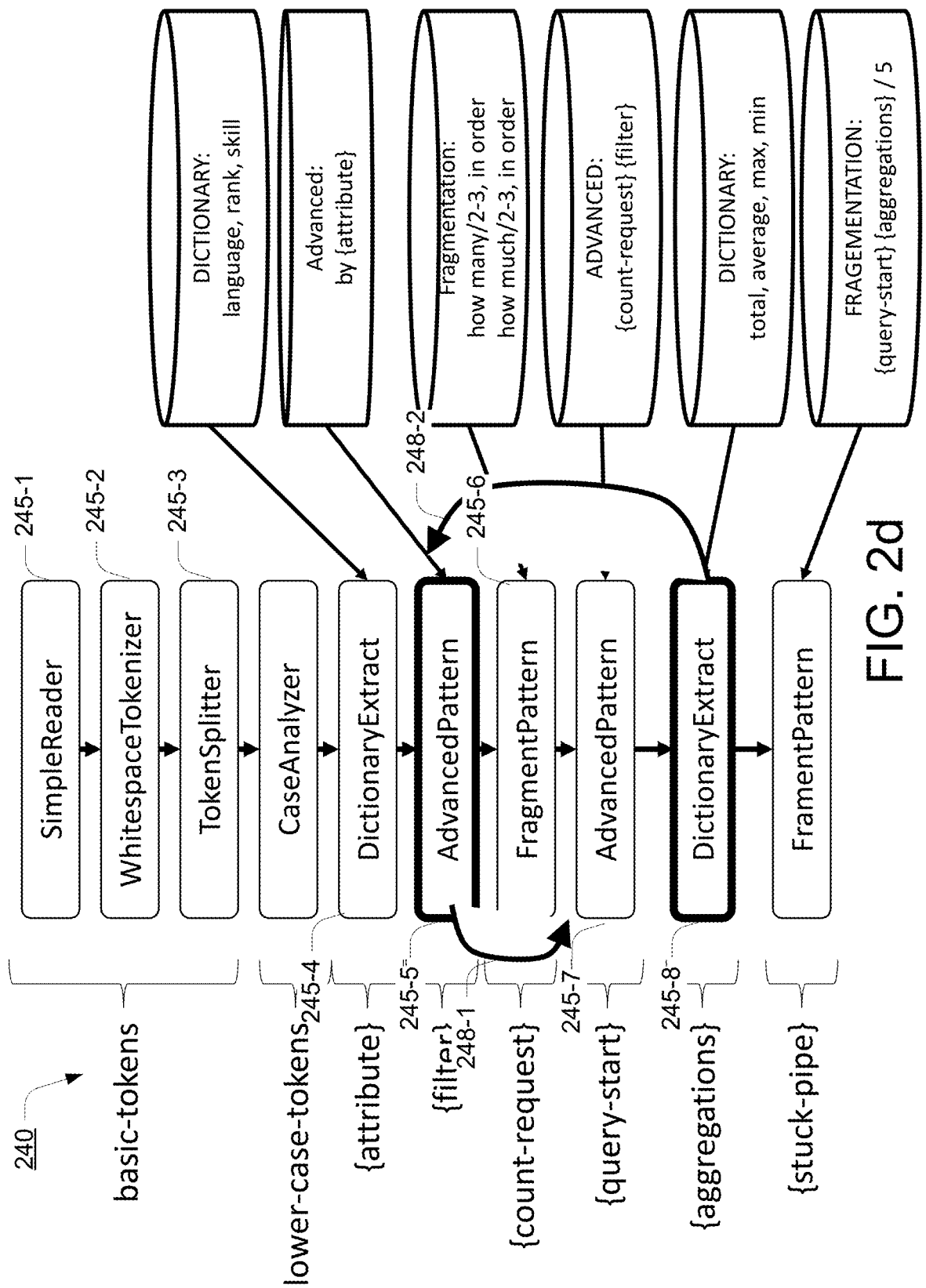

An example first pipeline 240 is illustrated in FIG. 2d. For the sake of brevity, generation and optimization of the pipelines is discussed with reference of the dependency graph 220-1. It will be appreciated that same principles may be used for generating pipelines with respect to other dependency graphs, such as the dependency graph 220-2. The first pipeline 240 includes a series of operations including simple reader 245-1, whitespace tokenizer 245-2, token splitter 245-3, . . . dictionary extractor 245-4, advance pattern parser 245-5, fragment pattern parser 245-6, another advance pattern parser 245-7, another dictionary extractor 245-8, and so on. The simple reader 245-1, the whitespace tokenizer 245-2, the token splitter 245-3 and the case analyser 245-9 may be used for generating lower case tokens 230-3 from FIG. 2b, on which one or more operations may depend.

As can be observed, the first pipeline 240 includes ten stages or operations to be executed, a few of which are repeated, such as the dictionary extractors 245-4 and 245-8, and advance pattern parsers 245-5 and 245-7. Such, identical operations, whose functionalities can be combined in a single unit/executer with resource data that can be combined may be identified as mergeable operations. In another example, operators may be mergeable if they have common sub-components which process the same input and produce the same output. In another example, the operators may be mergeable if they are the same operator but with different configurations which are themselves mergeable.

Again, referring back to FIG. 2a, at block 250, the first pipeline 240 may be modified to construct the second pipeline. In an example, the pipeline optimizer 250 may move the operations or stages up the first pipeline 240, based on dependency criteria. The dependency criteria may indicate that a move/shift may be valid as long as items are not moved before any of their dependencies from the dependency graph 220-1. The reordering may be performed to co-locate the mergeable operations.

In an example, for merging, upon identifying the potentially mergeable operations, one or more sets of fully mergeable operations may be identified, based on the dependency criteria and the dependency graph. A set of fully mergeable operations may correspond to a set of potentially mergeable operations filtered to include only those operations capable of being merged without causing a dependency conflict. The dependency conflict may be caused, when a merged operation provides semantic understanding that would be computed after the natural language operation that depends on that semantic understanding based on the dependency graph. Each such set of fully mergeable operations may then be merged into a single operation for optimization.

Figure 2E:
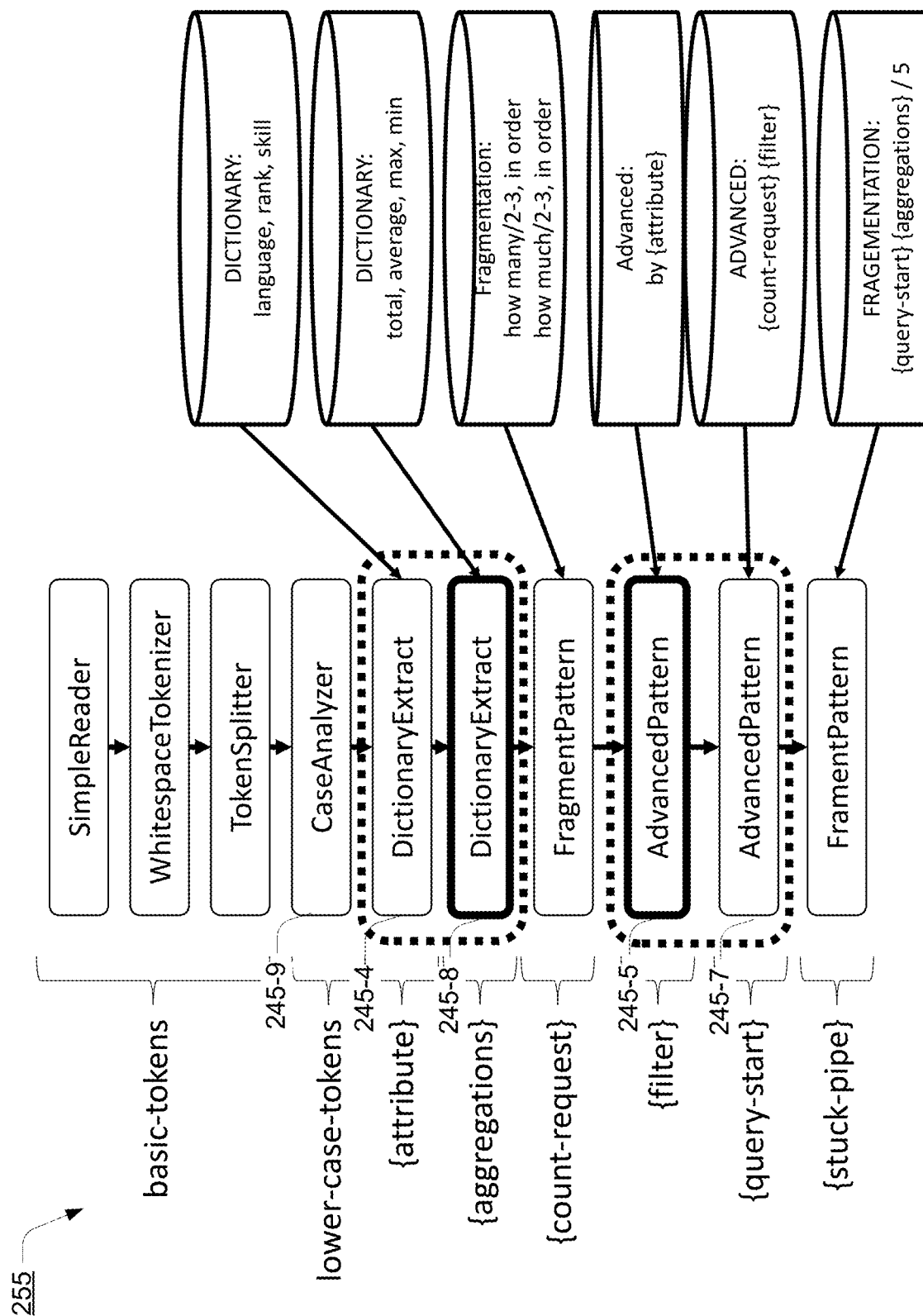
Figure 2F:
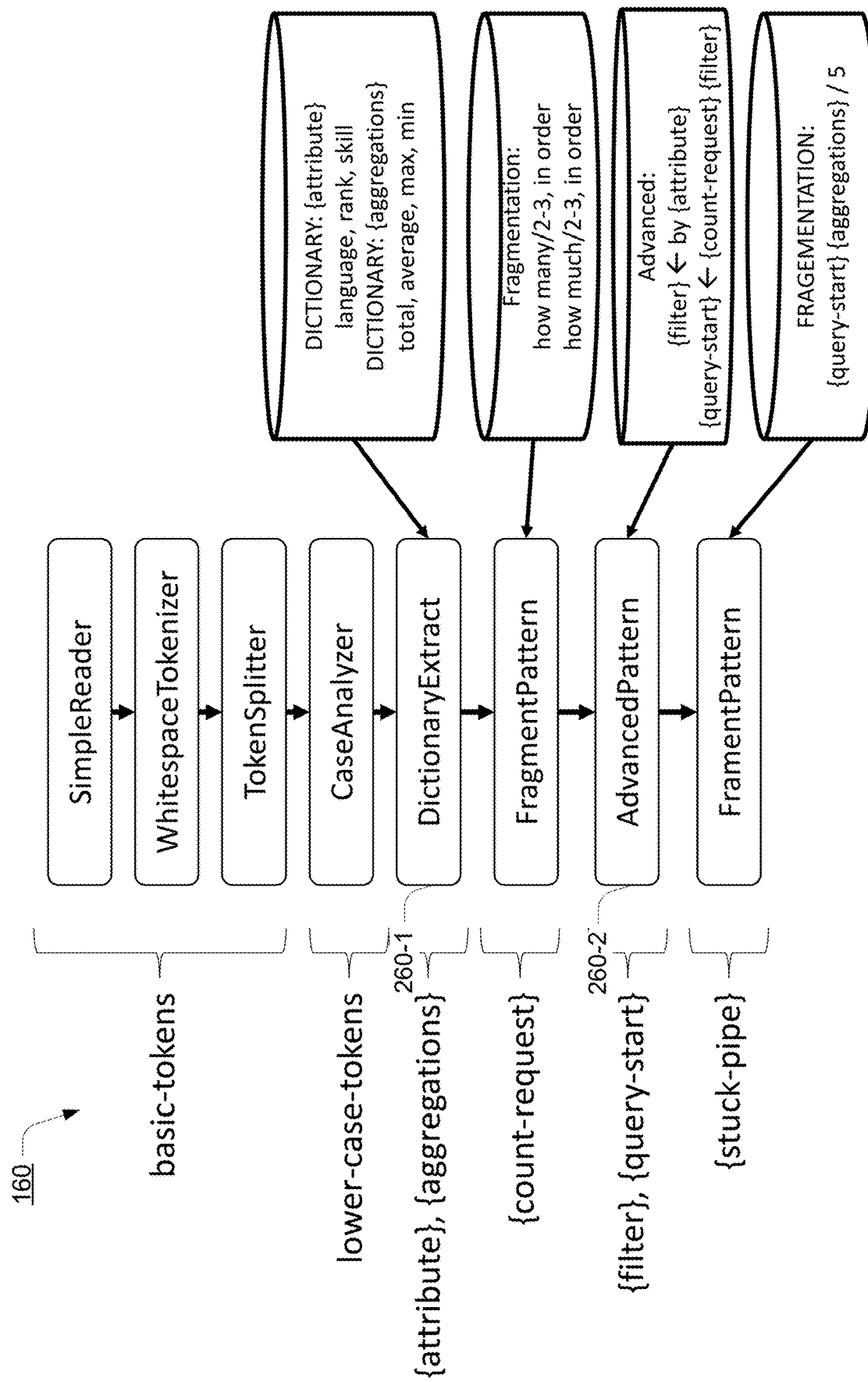

Referring to the dependency graph 220-1, it can be gathered that the related operation to the "{aggregations}" tag is a simple dictionary extractor which only depends on "lower-case-tokens". Similarly, the related natural language operation for "{filter}" 230-1 can be moved after {count-request} 230-4 since one does not depend on the other. Shifting of the operations and associated dependencies is indicated by arrows 248-1 and 248-2. Based on the shifting/reordering an intermediate pipeline 255 may be generated, which is illustrated in FIG. 2e. One of ordinary skill in the art can appreciate that shifting to reorder the pipeline is just one optimization method to create the final pipeline. In an example, the optimization could be performed by finding and merging operations where allowed as the first pipeline is created, thus creating the final optimized pipeline in a single step.

As can be seen in the intermediate pipeline 255, the mergeable operation the dictionaryextract 245-4 is co-located with dictionaryextract 245-8, and the mergeable operation, the advance pattern 245-5 is co-located with advance pattern 245-7. The fragment pattern operations may not be co-located without violating the dependency criteria. This new ordering provides for optimization, because typically the same stage which occurs twice in a row with mergeable resource data can now be combined into a single stage, with the patterns simply added together. In an example, such merging can improve performance because many pattern matching algorithms rely on hash-map lookups for matching patterns. Since the lookup time for a hash map is order $O(1)$, two such operations may have performance $O(2)$, whereas a single operation with the pattern data combined may have performance $O(1)$. In a second example, such merging can improve performance because many pattern matching algorithms use state machines for their lookup. State machines will process tokens and perform state transitions. Merging two operations allows for a single state transition for each new token rather than multiple. In another example, many neural network machine learning algorithms require preprocessing a token stream to provide appropriate input signals for neural network nodes. Such pre-processing can include looking up multi-dimensional vectors from a database for each token and using the vector values as inputs to the neural network. If multiple neural network techniques take the same input, then the techniques may be merged such that token vectors only need to be accessed from the database and normalized a single time, rather than once for each semantic tag which is tied to a neural network predictor operation.

Accordingly, the pipeline modifier 150 may merge the potentially mergeable operations, interchangeably referred to as mergeable operations, to generate an optimized pipeline, such as the optimized pipeline 260 as illustrated in FIG. 2e. The optimized pipeline 260 has eight stages/operations instead of ten and would therefore run faster than the first pipeline 240. As can be seen, the dictionary extracts 245-4 and 245-8 are now replaced by single dictionary extract 260-1 containing all patterns and advance patterns 245-5 and 245-7 are now replaced by single advance pattern 260-2 stage with a single resource containing all patterns. It will be appreciated as a request for semantic understanding gets complex and/or the input data is complex and/or the size of the dependency graph becomes large and complex, the number of operations may increase, where such optimization may provide faster processing of data. In addition, "dynamic as needed construction" of pipelines ensures that only a minimum amount of pipeline needs to be constructed for any specified application task.

Further, the automated construction of pipelines based on dependency graphs may enhance efficiency. For example, if "{mud-loss}" is to be computed, it is understood that a classification model, a volume measurement pattern recognizer (and it's supporting recognizers) and a lower-case-tokens processor would be needed. However, if all that is required is "{volume-measurement}", for example, if the client application only requires to know all of the volume measurements in a document, the pipeline graph generator 140 in consultation with the dependency graph from the dependency graph generator 135 may optimize the execution to automatically skip the {mud-loss} computations, creating a more efficient pipeline.

This may be done by starting with all of the requested tags, for instance, "{volume-measurement}" in the example above, and identifying all of their dependencies in the dependency graph, which for the above example include the tags "{number}" and "{units}" and the pipeline fragments "P #lower-case-tokens" and "P #basic-tokens". All other items may then be ignored and not added to the pipeline. In the example this would include the natural language operations associated with "{stuck-pipe}" and "{mud-loss}".

A pipeline once generated, can be specified once, and then used throughout the system 105 for multiple tasks, as against conventional systems, where a large number of pipelines may be created, all of which need to be independently managed—either in source code or in separate configurations. Traditionally, since pipelines may be manually constructed, separate pipelines are created, stored and maintained by developers for each of {stuck-pipe}, {volume-measurement}, {number} and {units}, each pipeline containing all of the dependee operations for that tag, resulting in a minimum of four pipelines all with multiple redundant copies of all dependee operations all needing to be separately maintained by developers.

In the present disclosure, configuration and resource data for each natural language operation may be configured and maintained once, irrespective of a number of times it may be used by depender tags. A depender tag being a tag which depends on a dependee tag. Further, complete pipelines are constructed as needed from all of the natural language operations described in the dependency graph, as needed and then discarded when done. This provides for producing an up-to-date pipeline for any semantic or syntactic tag, since updates to the configuration of any natural language operation may be immediately incorporated into new pipeline created for any depender tag.

In addition to providing for pipeline generation, dependency graphs can be displayed and navigated by developers and business subject matter experts, which may make debugging and analysis easier. Further, the output from any natural language operation associated with any semantic or syntactic tags may be made available to any other the natural language operation and multiple natural language operations associated another semantic or semantic tags, by specifying it as a dependency. This allows for natural language understanding to be layered, such that low-level understanding is built up into higher and higher levels of understanding, where the higher levels depend on lower level understanding to be computed earlier in the natural language pipeline. Semantic and syntactic tags and their dependency relationships and the configuration for their associated natural language operations can be stored in a database and easily navigated and managed, thereby allowing a system to scale to much larger numbers of tags and dependencies.

Moreover, incompatible dependencies may be identified where two different pipelines are required to produce the same classification. This may occur if two different NLP operations, which are both required to produce some higher-level classification, i.e. they are both dependees of a higher depender, are both themselves dependent on incompatible underlying natural language pipelines. As an example, one dependee may be built on a pipeline to tokenize Chinese, and a second may be built on a pipeline to tokenize and decompound German. Such incompatibilities may be automatically determined by traversing the dependency graph to determine if two natural language operations, which produce incompatible pipeline are both dependees of the same depender, or depender of depender, and so on.

Furthermore, multiple team members may work on their parts of the semantic space and coordinate through the dependency graph. Thus, the dependency graph and the automatic pipeline generator may aid in ensuring that changes by one team member are propagated automatically to other team members. This may be an outcome of the dependency graph and the pipeline generator. Since all pipelines may be generated as needed, on-demand, any changes made by any team member to improve processing by any natural language operation for any semantic tag may be automatically available to anyone who generates a natural language pipeline for semantic tags associated with natural language operators that depend on the updated processing. And so, improvements made by any team can be immediately and transparently picked up by other teams working on semantic understanding that depends on the improved natural language operator.

Further, the dependency graph and the automatic pipeline generator may determine how the work of the team members, for example, ML for tag {x} or training for tag {y}, is coordinated. This is performed by communicating changes and automated retraining through the dependency graph. In an example, if one team member modifies a natural language operation, the change can be automatically communicated to teams which depend on this output. Since the dependee output may have changed, this will necessitate retraining and retesting the machine learning models for depender semantic or syntactic tags which depend on the changed dependee tag, or which depend on a dependency of the tag, and so on. In this way, modified operations can either notify other teams or automatically perform retraining and retesting of depender operations as needed to ensure that the entire system is in-sync and up-to-date with the latest changes.

Figure 3:
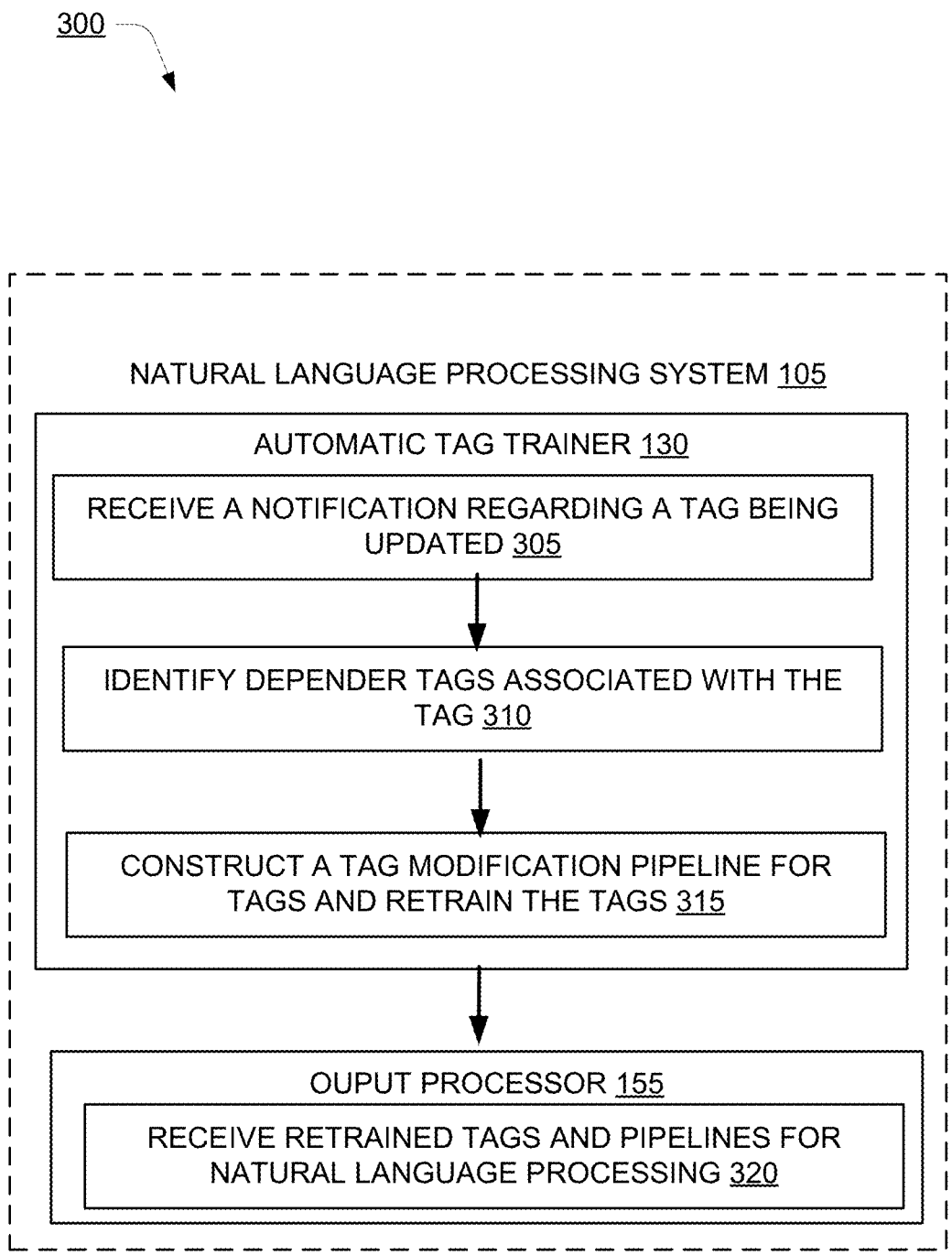
FIG. 3 illustrates another block diagram of the NLP system, according to an example embodiment of the present disclosure.

FIG. 3 illustrates a block diagram 300 for automated re-training of semantic and/or syntactic tags, according to an example embodiment of the present subject matter. In an example, the automated tag trainer 130 may provide for updating tags generated during the natural language processing by the system 105. At block 305, a notification of a tag being updated may be received. Automated re-training may be required, when dependencies change. A tag, such as a semantic tag, may be considered to be modified or changed, when a tag modification event occurs. The tag modification event being an event when an underlying natural language operation that produces the modified tag from natural language content changes, which may include one of changing the software code which implements the natural language operation, changing the configuration of the natural language operation, changing a resource which supplies data to the natural language operation, the resource including one of a database, a file, and an external system. The tag may also be considered to change, when natural language text processing operations are changed, the natural language text processing operations produce modified representations of the input data that are required by at least one natural language processing operation associated with the modified tag.

In an example, to retrain the tag, the tag itself and corresponding depender tags may be retrained to reflect modifications made to the tag, a depender tag corresponding to a modified tag being a tag, which depends on the modified tag and/or a tag, which depends on any tag which is retrained including dependencies of dependencies to any level of dependency nesting. The retraining of the multiple depender tags, for instance, may be performed in parallel, such that no tag is retrained before or overlapping with any tag upon which it depends, including dependencies of dependencies to any level of nesting. Thus, a tag is retrained after a tag, upon which it depends.

For example, referring back to the dependency graph in FIG. 2c, if more units are added to the "Units Dictionary" to improve the recognition of the "{units}" tag, then this will change the output produced by the "{volume-measurement}" tag which will in-turn change the output provided to the "{mud-loss}" classifier. Therefore, to stay up-to-date with these dictionary changes, the "{mud-loss}" classifier should be re-trained, reprocessing the input through a natural language pipeline which contains the updated "{units}" dictionary and re-training the machine learning model to classify "{mud-loss}".

At block 310, depender tags associated with an operation are identified using the dependent graphs associated with the semantic tag. At block 315, a pipeline may be constructed for each depender tag which depends on the changed tag either directly or indirectly. Then each depender tags is retrained using the updated pipeline, which may include the modified natural language operation associated with the changed semantic tag. This process may continue in order as specified by the dependency graph to ensure that no depender tag is retrained until all of its dependees have been retrained as necessary. This may ensure that the minimum amount of retraining is performed and that tags don't have to be retrained multiple times.

In an example, "retraining" in the present context includes training a machine learning algorithm on training data, performing a quality evaluation on the accuracy of the machine learning algorithm, and determining if the level of accuracy is sufficient to create a working system. The "retraining" may also include, simply, regression testing, where the system is evaluated against previously stored examples of "correct" and "incorrect" outcomes of natural language understanding, with a similar evaluation determining if the level of accuracy is sufficient for a working system. Further, if the level of accuracy is not sufficient, then an example system may rollback changes and send an appropriate notification.

At block 320, updated pipelines with retrained tags are received for natural language processing to the output processor 155.

Figure 4A:
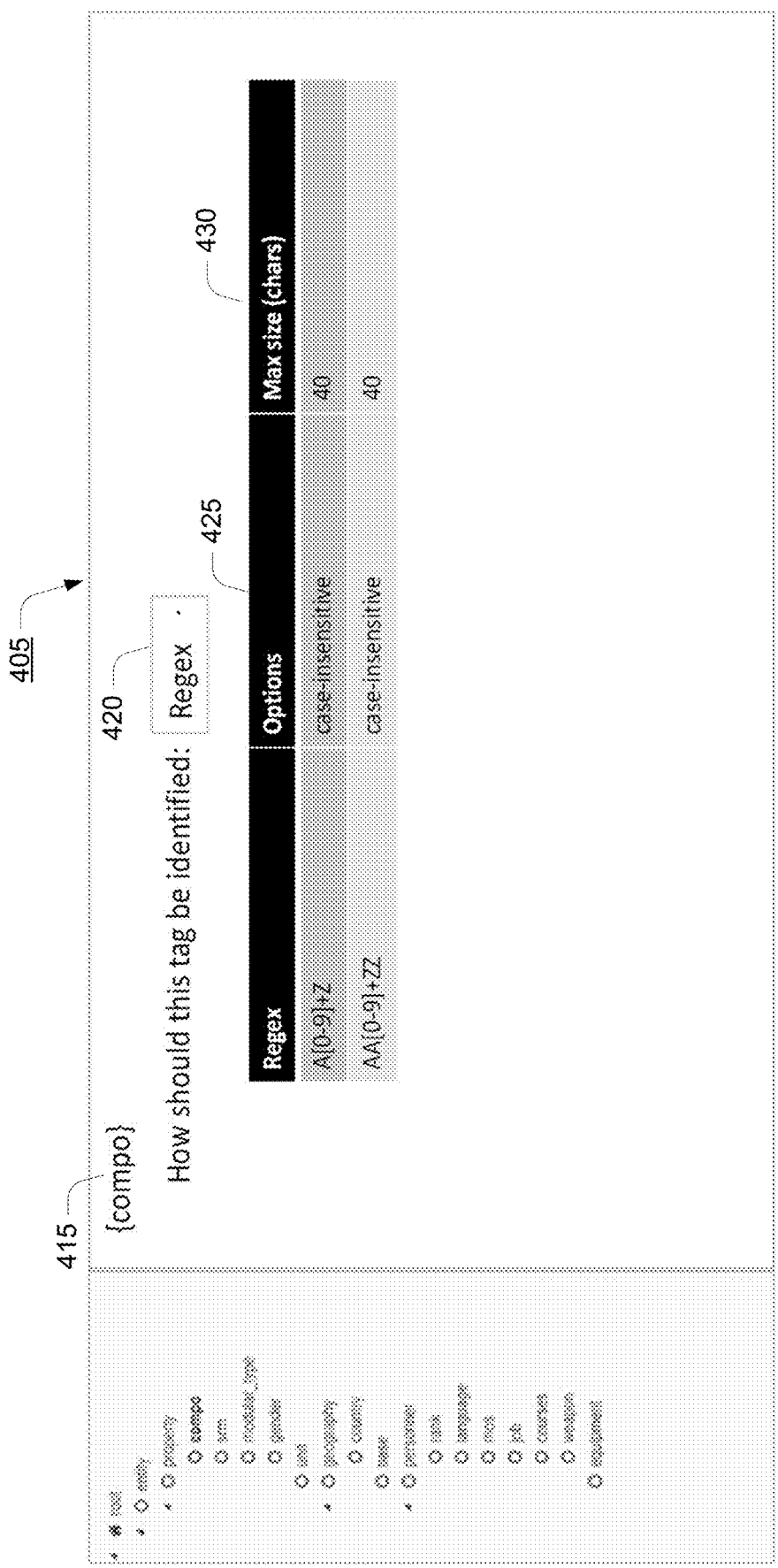
FIGS. 4a and 4b illustrate screenshots of configuring tags for NLP, according to an example embodiment of the present disclosure.
Figure 4B:

FIG. 4a and FIG. b illustrate example screenshots 405 and 410 for configuring a tag. As indicated in screenshot 405, a tag corresponding to "compo" 415 may be identified as regex 420, i.e., regular expression. Not shown is how the compo regex operation depends on a baseline natural language pipeline to initially prepare the text and tokenize the incoming content. Further, size 425 and other options 430 for the tag may be defined. In an example, the tags may be generated and defined by, on executing a second pipeline. The "compo" 415 may be a military jargon for "component", referencing an organizational unit within the active duty force. The example shows how a component can be referenced by an identifier with a specific set of character patterns that can be recognized using a regular expression pattern matcher. Therefore, in present example "{compo}" is the semantic tag identifying a military organizational unit, and the associated natural language operation is a regular expression pattern matcher which has two patterns as part of its resource database.

Referring to screenshot 410, a different method for identifying a different "compo" semantic tag 420 is shown. In this example, a machine learning classifier is configured. In addition to choosing the classification model (Naïve Baysean) 445 and the "max counts" parameter, the configuration identifies dependee tags 440 which should be pre-recognized to provide input data to the classifier. These dependee tags include the semantic tag "{measurement}" and "{units}" and syntactic tag "{number}". When configured, the example system may create dependency links in the dependency graph from {measurement}, {units} and {number} (the dependees) up to {compo} (the depender) which depends on these tags. In this way, any change to these dependee tags, may automatically trigger a retraining of the {compo} tag in this example to ensure that the classifier stays up-to-date with the expected input data. As an example, suppose additional types of units, units being measurement units like 'meters', 'millimeters', 'feet', 'gallons', etc. are added to the pattern dictionary used to recognize the {units} tag. This seemingly small change could have a profound impact on the {compo} classifier, because the input used for classification is now changed in nature.

Again, referring to screenshot 410, it can be observed that the machine learning classifier is configured such that automated retraining can be performed. In the screenshot, the input data set (Wells Data Set) is provided which has natural language content to use as examples, and possibly correct answers for the classifier to train against as well. Further the "manual review" button 450 can be used to review the data set and provide human input which can also be used as correct answers for training purposes.

Finally, all of the input data and the manual or input correct answers may be saved so that, by pressing the "Run Training" button 455, the training occurs automatically, using the pre-defined input data set with the currently available target answers against which the machine learning algorithm is trained and evaluated. It should be apparent to one with ordinary skill in the art that the button could be automatically pressed whenever there are changes to any of the dependee tags ({measurement}, {number}, or {units} 440) upon which the depender tag, {compo} 420, depends.

Figure 5:
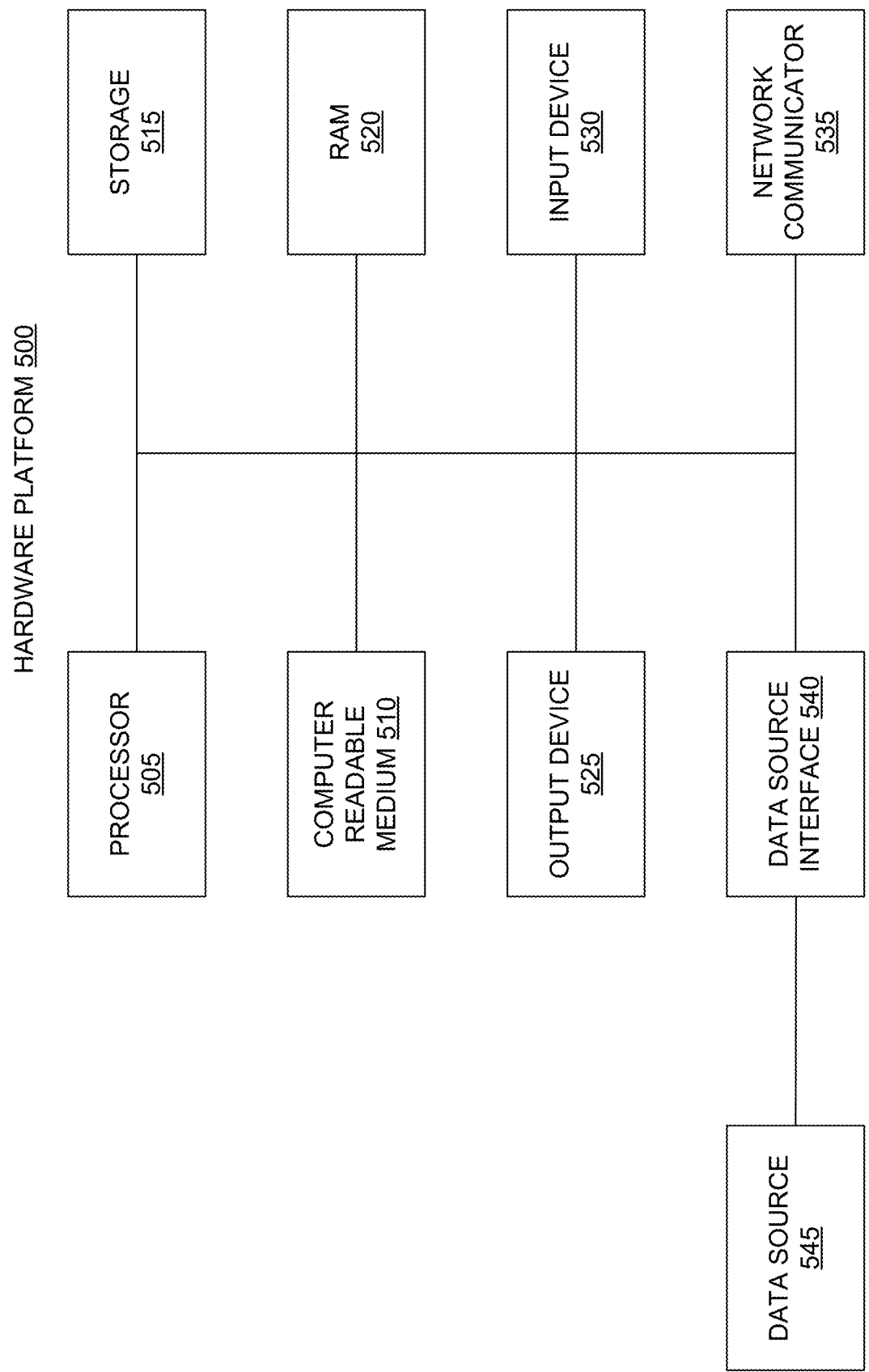
FIG. 5 illustrates a hardware platform for implementation of the system, according to an example embodiment of the present disclosure.

FIG. 5 illustrates a hardware platform 500 for embodiment of the system 100, according to an example embodiment of the present disclosure. Particularly, computing machines such as but not limited to internal/external server clusters, quantum computers, desktops, laptops, smartphones, tablets and wearables which may be used to execute the system 105 or may have the structure of the hardware platform 500. The hardware platform 500 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over the FIG. 5, the hardware platform 500 may be a computer system 500 that may be used with the examples described herein. The computer system 500 may represent a computational platform that includes components that may be in a server or another computer system. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 500 may include a processor 505 that executes software instructions or code stored on a non-transitory computer readable storage medium 510 to perform methods of the present disclosure. The software code includes, for example, instructions to detect an issue and forward the issue for processing, collect data from other employees and teams, analyze the data to determine a solution for the issue and provide the solution to the employee.

The instructions on the computer readable storage medium 510 are read and stored the instructions in storage 515 or in random access memory (RAM) 520. The storage 515 provides a large space for keeping static data where at least some instructions could be stored for later execution. The stored instructions may be further compiled to generate other representations of the instructions and dynamically stored in the RAM 520. The processor 505 reads instructions from the RAM 520 and performs actions as instructed.

The computer system 500 further includes an output device 525 to provide at least some of the results of the execution as output including, but not limited to, natural language processing based on a second pipeline generated using a dependency graph. The output device 525 can include a display on computing devices and virtual reality glasses. For example, the display can be a mobile phone screen or a laptop screen. GUIs and/or text are presented as an output on the display screen. The computer system 500 further includes input device 530 to provide a user or another device with mechanisms for entering data and/or otherwise interact with the computer system 500. The input device may include, for example, a keyboard, a keypad, a mouse, or a touchscreen. In an example, output of a bot is displayed on the output device 525. Each of these output devices 525 and input devices 530 could be joined by one or more additional peripherals.

A network communicator 535 may be provided to connect the computer system 500 to a network and in turn to other devices connected to the network including other clients, servers, data stores, and interfaces, for instance. The network communicator 535 may include, for example, a network adapter such as a LAN adapter or a wireless adapter. The computer system 500 includes a data source interface 540 to access data source 545. A data source is an information resource. As an example, a database of exceptions and rules may be a data source. Moreover, knowledge repositories and curated data may be other examples of data sources.

Figure 6A:
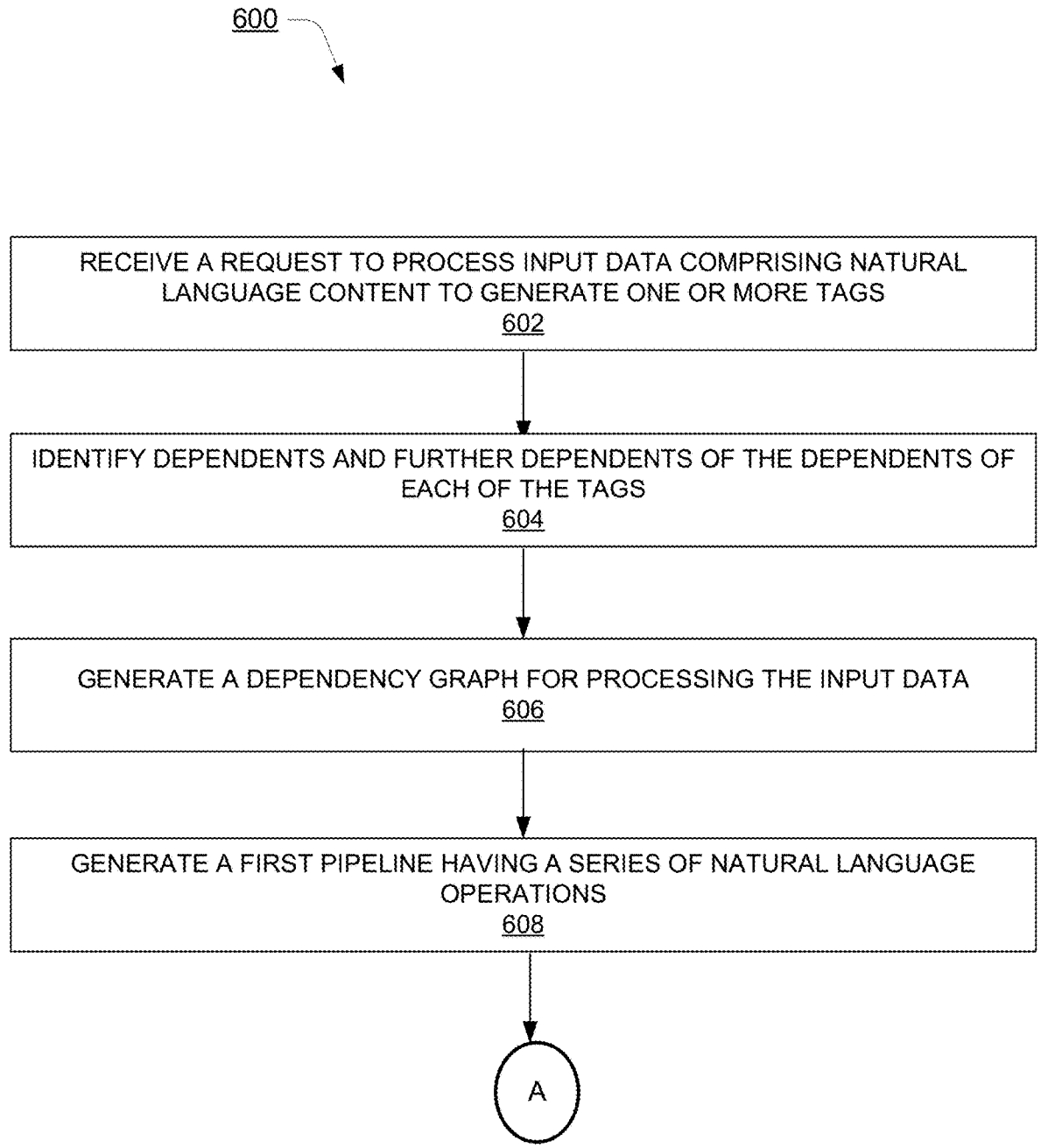
FIG. 6a and FIG. 6b illustrate a computer-implemented method for NLP to generate semantic tags, according to an example embodiment of the present disclosure.
Figure 6B:
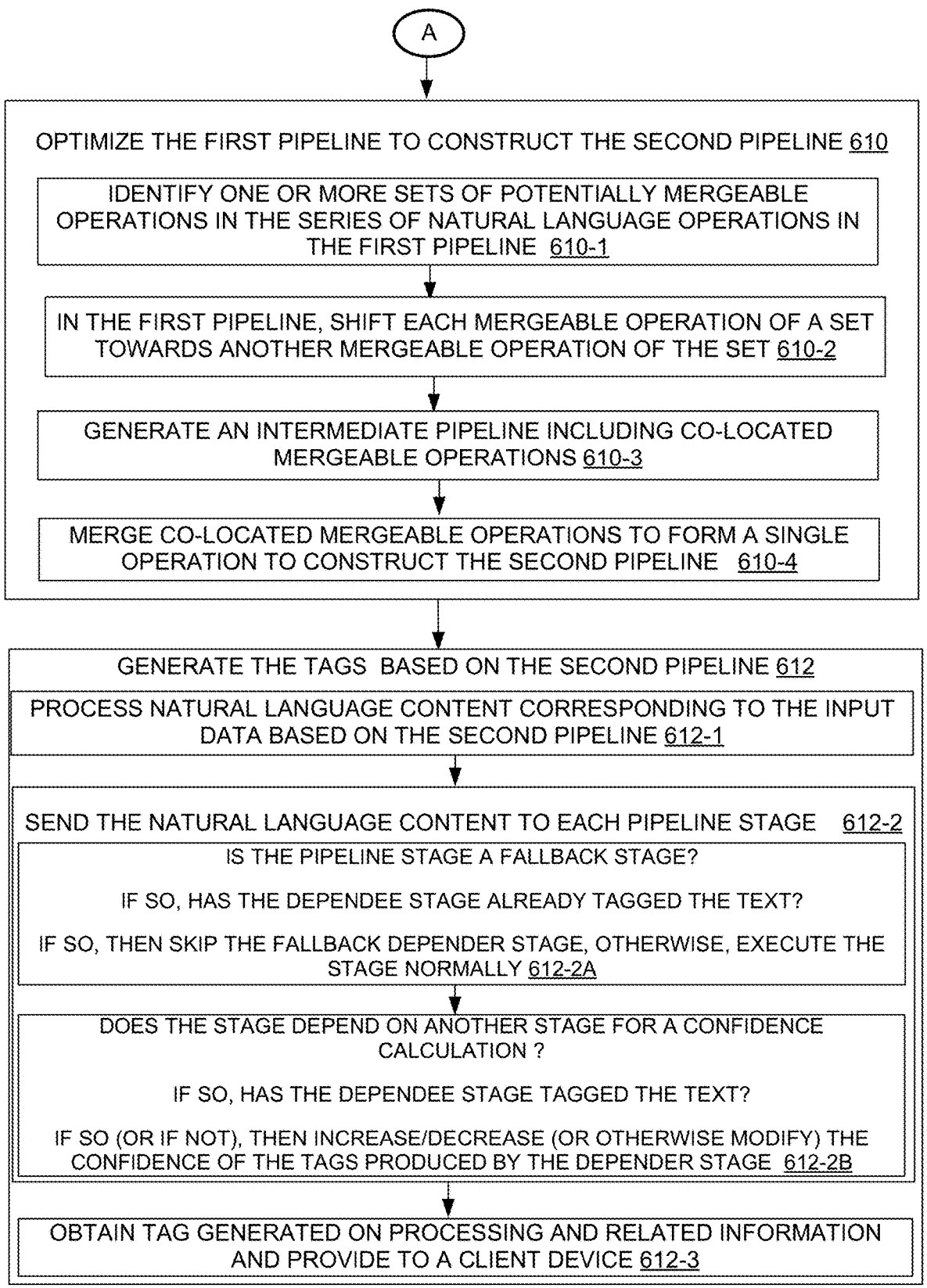

FIG. 6a and FIG. 6b illustrate a computer-implemented method 600 depicting functionality of the system 105, according to an example embodiment of the present disclosure. For the sake of brevity, construction and operational features of the system 105 which are explained in detail in the description of FIG. 1, FIG. 2a-FIG. 2f, FIG. 3, FIG. 4a, and FIG. 4b are not explained in detail in the description of FIG. 6.

At block 602, a request to process input data comprising natural language content to generate one or more tags, such as semantic tags and syntactic tags, may be received. Semantic tags may be indicative of semantic interpretation of corresponding portions of the input data. The syntactic tags could include, for example, a noun tag, a verb tag, an active object tag and a passive object tag.

At block 604, dependees and further dependees of the dependees, where a dependee is depended upon by a depender, of each of the semantic tags may be identified. In a dependency graph, at least one of processing and resources required to provide a necessary input for a natural language operation to generate the semantic tag is provided as a dependee and further dependees.

At block 606, the dependency graph for processing the input data may be generated. The dependency graph may be created, based on the identified dependees and the further dependees, the dependency graph including natural language operations and corresponding dependees and corresponding further dependees arranged in order of their dependencies on each other. In an example, the dependency graph generator 130 may generate the dependency graph.

At block 608, a first pipeline including a series of natural language operations in an order as they appear in the dependency graph may be generated such that natural language operations associated with dependees are generated before the natural language operations of the dependers which depend up them. A pipeline (first, intermediate, or second) includes a plurality of operations to be executed in a predefined order to generate the semantic or syntactic tags.

At block 610, the first pipeline may be modified to construct a second, optimized pipeline including a modified series of natural language operations, based on the dependency graph. The number of natural language operations in the second pipeline may be less than the number of the natural language operations in the first pipeline, thereby making the second pipeline run faster to process the data efficiently. In an example, the pipelines may be generated by the pipeline generator 135.

To optimize, at block 610-1, one or more potentially mergeable operations of the natural language operations in the first pipeline may be identified. A set of potentially mergeable operations include natural language operations having at least one of identical functionality, identical functionality but supported by different resource data where the resource data is itself mergeable, identical functionality but with different configuration where the configuration data is itself mergeable, or be made up of sub-components which provide the functionality, some of those sub-components being identical, processing the same input and providing the same output, or otherwise being mergeable.

At block 610-2, in the first pipeline, each mergeable operation of the set may be shifted towards another mergeable operation of the set to co-locate the mergeable operation next to another mergeable operation, the shifting being based on the dependency graph. For instance, shifting may be based on a dependency criteria, the dependency criteria indicating that a movement to shift the mergeable operation upwards or downwards from its current position is valid, when no dependee is processed after the dependers which depend upon it in the dependency graph.

At block 610-3, an intermediate pipeline including the mergeable operations co-located may be generated.

At block 610-4, co-located mergeable operations may be merged to form a single operation to construct the second, optimized pipeline. Thus, the second pipeline may have a reduced number of operations as compared to a basic one, thereby making it faster, while retaining accuracy. It will be appreciated by one of ordinary skill in the art that the optimized pipeline may be generated by the pipeline generator in a single step, where mergeable operations are identified using the dependency graph and immediately merged as the first pipeline is being constructed, the result being an optimized pipeline produced without the need to construct and modify any intermediate or second pipelines.

At block 612, the tags may be generated, based on the generated, possibly optimized pipeline. In an example, the pipeline executor of the output processor 155 may receive, from the pipeline generator 410, the pipeline to be used to generate the requested tags. To generate the tags, at block 612-1, natural language content corresponding to the input data may be processed, based on the pipeline.

At block 612-2, the natural language content, such as text, is provided to each pipeline stage. At block 612-2A, it is determined if the pipeline stage is a fallback stage. If the pipeline stage is a fallback stage, it is determined if the dependee stage has already tagged the text. If it is determined that the dependee stage has already tagged the text, then the fallback depender stage may be skipped. Otherwise, the depender stage is executed normally.

In an example, at block 612-2A, it is determined if the depender tag is executed or skipped, based on whether the pipeline stage is a fallback stage. In an example, the output of one or more dependee tags may be used to determine the execution of a depender tag to determine if the pipeline stage is a fallback stage. In standard natural language content processing pipelines, the content is passed from one pipeline stage to another, as ordered by the algorithms or techniques specified above. If the depender tag is a fallback tag, then it can check to see if its dependee tag has produced any output. If the dependee tag has already tagged the natural language content, then the depender tag can skip processing the natural language content because it is assumed that the dependee tag has already produced a more accurate analysis of the natural language content. In case the dependee tag is unable to tag the natural language content (e.g. the dependee tag has not added any tags to the understanding of the natural language text) the depender tag may execute.

It will be appreciated that the determination of "does a dependee tag exist" may also be interpreted as "does the dependee tag exist with a confidence level above a specified threshold".

In an example, a depender tag for a depender operation may be generated, based on existence of a dependee tag generated by a previously executed dependee operation. The existence of the dependee tag is based on corresponding dependee tag's confidence score, which is determined, based on the output of the dependee tag. For example, dependee tags with a low confidence (below a threshold) may be considered to "not exist". For example, when it is ascertained that the dependee tag exists with a confidence level above a threshold, then execution of the depender operation may be skipped; and when it is ascertained that the dependee tag does not exist (or exists with a confidence level below a threshold), the depender operation is executed to allow the depender tag to act as a fallback to the dependee tag. Thus, a depender operation may change its behavior based on the existence and confidence score of a dependee tag.

Further, at block 612-2B it is determined if the pipeline stage depends on another stage for a confidence calculation. When the pipeline stage depends on the other stage for the confidence calculation, it is determined if the dependee stage has already tagged the text. Based on the dependee stage tagging the text, the confidence of the tags produced by the depender stage may be modified, for instance, increased or decreased. For example, if the dependee tag exists (or exists above a specified threshold), then the depender's confidence level may be boosted.

In an example, at block 612-2B, it may be determined how the output of a dependee tag may affect the confidence of a depender tag, i.e., it may be determined if a depender tag depends on a dependee tag for a confidence calculation. In an example, when the depender tag executes, it is known that the dependee tag has already executed. Therefore, the depender tag can check for the presence (or absence) of the dependee tag to compute the confidence score of the depender tag. For example, the presence of the dependee tag may provide additional context that strengthens the confidence of the depender tag. Alternatively, the presence of the dependee tag may provide contradictory evidence which reduces the confidence of the depender tag.

Further, confidence scores of depender tags produced by the depender tag may be modified, based on the existence of the dependee tag. For example, it may be determined if the dependee tag exists (or exists with a confidence score above a specified threshold) and has tagged the natural language content. Accordingly, the confidence score of the tags produced by the depender tag may be modified, such as increased or decreased.

At block 612-3, the semantic tags generated by executing the pipeline on the input content using the natural language operations and their associated resource data and other related information may be obtained and provided to a client device. In an example, resource data and related information includes data such as pattern data, machine learning models, configurations, settings, parameters, state machines and the like.

In another example, the method may include receiving a request to process input data to generate a tag, such as a semantic tag or a syntactic tag, the semantic tag being indicative of semantic interpretation of a corresponding portion of the input data; identifying dependents and a further dependents of the dependents of the tag, wherein at least one of processing and resources required to provide a necessary input for a natural language operation to generate the tag is identified as the dependent and the further dependent; creating a dependency graph, based on the identified dependents and the further dependents, the dependency graph including natural language operations, corresponding dependents, and corresponding further dependents arranged in an order of and linked by their dependencies; generating a first pipeline including a series of natural language operations in an order as they appear in the dependency graph, a pipeline including a plurality of operations to be executed in a predefined order to generate the semantic tag; modifying the first pipeline to construct a second pipeline including a modified series of natural language operations, based on the dependency graph, a number of natural language operations in the second pipeline being less than a number of the natural language operations in the first pipeline; and providing the second pipeline to generate the tag for interpreting the input content.

The method further includes identifying, upon generating the first pipeline, a set of mergeable operations in the series of natural language operations in the first pipeline, shifting in the first pipeline, a mergeable operation of the set of the mergeable operations towards another mergeable operation of the set of the mergeable operations to co-locate the mergeable operation next to the another mergeable operation, the shifting being based on a dependency criteria, and generating an intermediate pipeline including the mergeable operation co-located with the another mergeable operation. Further, co-located mergeable operations may be merged to construct the second pipeline.

Figure 7:
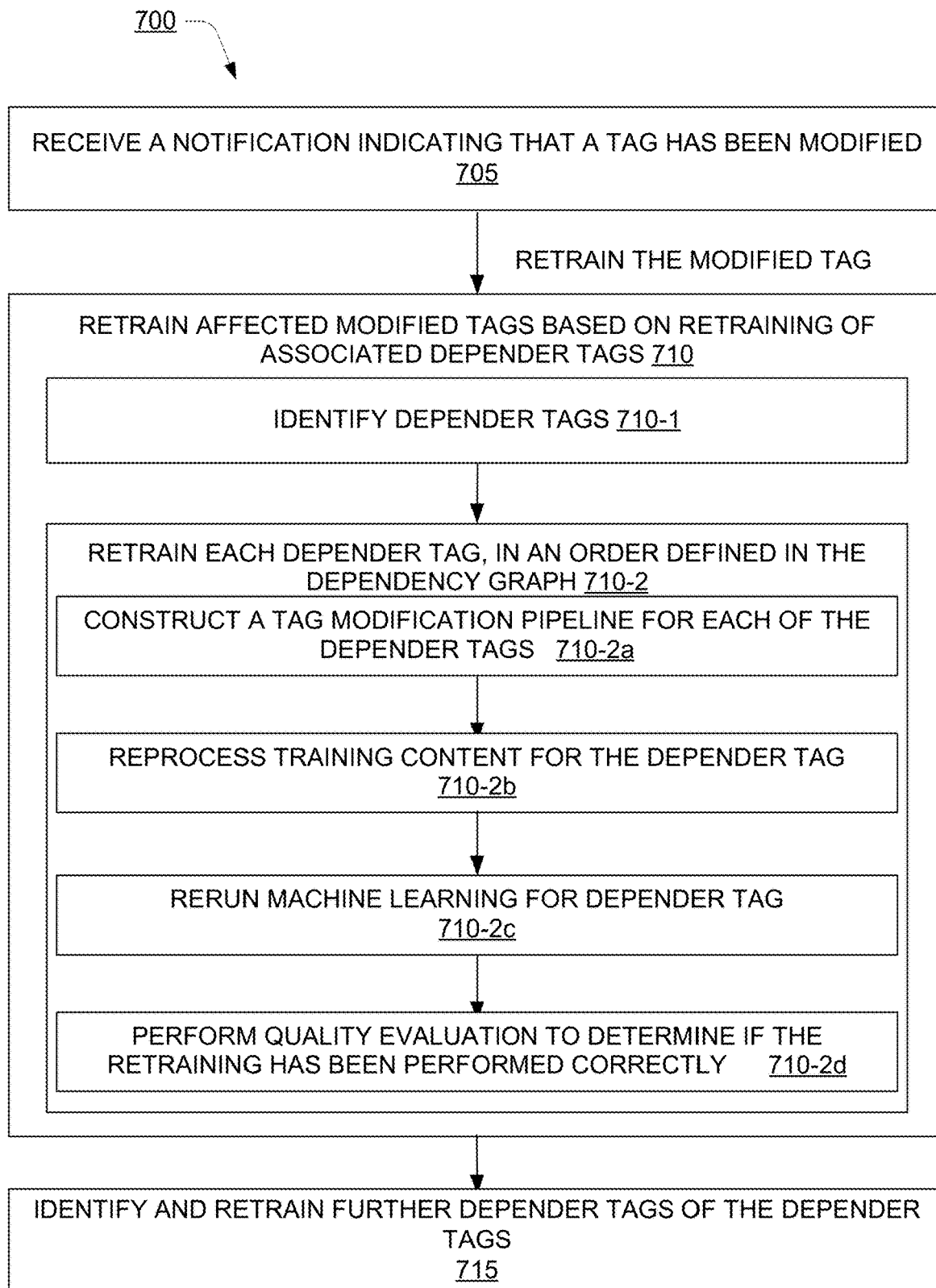
FIG. 7 illustrates a computer-implemented method for retraining generated semantic tags, according to an example embodiment of the present disclosure.

FIG. 7 illustrates a computer-implemented method 700 for retraining and retesting tags, according to an example embodiment of the present disclosure. For the sake of brevity, construction and operational features of the system 105 which are explained in detail in the description of FIG. 1, FIG. 2a-FIG. 2f, FIG. 3, FIG. 4a, and FIG. 4b are not explained in detail in the description of FIG. 7. In an example, the method 700 may be performed by the automated tag trainer 130.

At block 705, a notification may be received that a tag, such as semantic tag has been modified. For instance, a semantic tag may be modified when an associated pattern changes, processing options change, processing software changes, the configuration changes, or associated resource data changes, resource data including pattern data, configuration, machine learning models, pipeline configurations, state machine data, training data, test data, reformatted input data, new target answers for training, and the like.

At block 710, the semantic tag may be retrained, using previously stored test data and sample answers such that the new machine model may use the new input data, modified natural language operation, and/or new resource data to train a new machine learning model to produce the semantic understanding indicated by the associated semantic tag.

Further, the semantic tag may identify additional depender semantic tags which depend upon the modified semantic tag that also need to be retrained and retested, based on retraining of associated dependee tags. At block 710-1, the dependency graph is used to identify tags which depend upon the first modified tag. Each depender tag is next retrained in block 710-2, in an order as defined in the dependency graph, for instance, in an order such that depender tags which first depend only on the modified tag or only on the modified tag and any other tag which does not depend on the modified tag (or depend on a tag which depends on the modified tag, to any level of nesting) are retrained first, followed by any remaining depender tags which depend only on a tag which is now fully retrained possibly including other tags which are unaffected and not require retraining, and so on until all depender tags are retrained. The depender tag may be a tag which depends on a dependee tag.

Blocks 710-2a through 710-2d depict the retraining process, where retraining involves first constructing a pipeline for the tag to be retrained 710-2a using the pipeline generator 140 in communication with the dependency graph generator 135, followed by reprocessing of the training content using the constructed pipeline 710-2b, followed by using the output of the constructed pipeline to train a new machine learning model 710-2c, followed by an evaluation of the accuracy of the model against evaluation data and/or other accuracy metrics and indicators, followed by a possible rollback of training and a notification of error if the accuracy is insufficient to meet the requirements of the application as a whole.

At block 715, once the dependers of the original semantic tag have been retrained, then additional dependers of those dependers may now be identified and retrained using the same method as shown in block 710, after which dependers of the dependers of the dependers can be retrained, and so on until all dependers of any level of nesting have been retrained.

In an example, machine learning may be not required and retraining may include reprocessing and retesting the training content for accuracy, such as regression testing.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
a processor;
a data reader coupled to the processor to receive a request to process input data to generate tags for interpreting the input data;
a natural language processor comprising natural language processing operations to tag the input data with the tags, wherein the natural language processing operations include depender operations and dependee operations, and wherein the depender operations require tagged output of the dependee operations as input;
a dependency graph generator, coupled to the processor to:
identify dependees of the tags, and further dependees of the dependees of the tags, a dependee being one of a tag and a natural language operation upon which the tag depends, wherein at least one of natural language processing operations and resources required to provide an input for the natural language operation to generate the tags is identified for each dependent and further dependents; and
create a dependency graph, based on the identified dependents and the further dependents, the dependency graph including the natural language processing operations, corresponding dependents, and corresponding further dependents arranged in an order of and linked by their dependencies; and
a pipeline generator coupled to the processor to,
generate a pipeline including a series of natural language operations, based on the dependency graph, wherein the pipeline includes a plurality of natural language processing operations to be executed in a predefined order to generate the tags; and
provide the pipeline to generate the tags for interpreting the input data.

2. The system of claim 1, wherein the pipeline includes the series of natural language operations ordered as they appear in the dependency graph such that the natural language operations for dependee tags are processed before any of their associated depender tags, a depender tag being a tag which depends on a dependee tag.

3. The system of claim 1, wherein, upon generating the pipeline, the pipeline generator creates an optimized pipeline using the dependency graph merging a set of potentially mergeable operations in the series of natural language operations.

4. The system of claim 1, wherein the system further includes an automated tag trainer coupled to the processor to:
receive a notification that a tag, from among the tags, has been modified; and
automatically retrain a modified tag and corresponding depender tags to reflect modifications made to the tag, a depender tag including one of a tag which depends on the modified tag and another tag, which depends on any tag which is retrained including dependencies of dependencies to any level of dependency nesting.

5. The system of claim 4, wherein the tag is considered to be modified when a modification events occurs, the modification event includes at least one:
changing an underlying natural language operation that produces the modified tag from natural language content including one of changing the software code which implemented the natural language operation, changing the configuration of the natural language operation, and changing a resource which supplies data to the natural language operation, the resource including one of a database, a file, and an external system; and
changing natural language text processing operations that produce modified representations of the input data that are required by at least one natural language processing operation associated with the modified tag.

6. The system of claim 5, wherein, when the modified tag comprises multiple depender tags, the automatic tag trainer is to retrain the multiple depender tags in parallel, based on the dependency graph, and wherein parallel retraining is performed such that each tag is retrained after the tag upon which it depends, including dependencies of dependencies to any level of nesting.

7. The system of claim 4, wherein the automated tag trainer to retrain the modified tag is to:
identify the depender tag corresponding to the modified tag;
construct a tag modification pipeline for each depender tag;
reprocess training content for the depender tag;
re-run machine learning training for the depender tag; and
perform a quality evaluation to determine whether the depender tag has been trained correctly.

8. The system of claim 1, wherein the system further comprises a processor, which includes a pipeline executor to generate depender tags using a depender operation, based on an existence of an associated dependee tag generated by a previously executed dependee operation, and wherein the existence of the dependee tag is a function of a confidence score of the dependee tag.

9. The system of claim 8, wherein the pipeline executor is to:
when it is ascertained that the dependee tag exists, skip the execution of the depender operation; and
when it is ascertained that the dependee tag does not exist, execute the depender operation to allow the depender tag to act as a fallback to the dependee tag.

10. The system of claim 8, wherein confidence scores of depender tags produced by the depender operations are modified, based on the existence of the dependee tags.

11. A method comprising:
receiving a request to process input data to generate tags for interpreting the input data;
implementing natural language processing operations to tag the input data with the tags, wherein the natural language processing operations include depender operations and dependee operations, and wherein the depender operations require tagged output of the dependee operations as input;
identifying dependees of the tags, and further dependees of the dependees of the tags, a dependee being one of a tag and a natural language operation upon which the tag depends, wherein at least one of natural language processing operations and resources required to provide an input for the natural language operation to generate the tags is identified for each dependent and further dependents;
creating a dependency graph, based on the identified dependents and the further dependents, the dependency graph including the natural language processing operations, corresponding dependents, and corresponding further dependents arranged in an order of and linked by their dependencies;
generating a pipeline including a series of natural language operations, based on the dependency graph, wherein the pipeline includes a plurality of natural language processing operations to be executed in a predefined order to generate the tags; and
providing the pipeline to generate the tags for interpreting the input data.

12. The method of claim 11, wherein the pipeline includes the series of natural language operations ordered as they appear in the dependency graph such that the natural language operations for dependee tags are processed before any of their associated depender tags, a depender tag being a tag which depends on a dependee tag.

13. The method of claim 11, wherein the method further comprises: upon generating the pipeline, creating an optimized pipeline using the dependency graph merging a set of potentially mergeable operations in the series of natural language operations.

14. The method of claim 11, wherein the method further comprises:
receiving a notification that a tag, from among the tags, has been modified; and
automatically retraining a modified tag and corresponding depender tags to reflect modifications made to the tag, a depender tag including one of a tag which depends on the modified tag and another tag, which depends on any tag which is retrained including dependencies of dependencies to any level of dependency nesting.

15. The method of claim 14, wherein the tag is considered to be modified when a modification events occurs, the modification event includes at least one:
changing an underlying natural language operation that produces the modified tag from natural language content including one of changing the software code which implemented the natural language operation, changing the configuration of the natural language operation, and changing a resource which supplies data to the natural language operation, the resource including one of a database, a file, and an external system; and
changing natural language text processing operations that produce modified representations of the input data that are required by at least one natural language processing operation associated with the modified tag.

16. The method of claim 15, wherein, when the modified tag comprises multiple depender tags, retraining the multiple depender tags in parallel, based on the dependency graph, and wherein parallel retraining is performed such that each tag is retrained after the tag upon which it depends, including dependencies of dependencies to any level of nesting.

17. The method of claim 14, wherein retraining the modified tag comprises:
   identifying the depender tag corresponding to the modified tag;
   constructing a tag modification pipeline for each depender tag;
   reprocessing training content for the depender tag;
   re-running machine learning training for the depender tag; and
   performing a quality evaluation to determine whether the depender tag has been trained correctly.

18. The method of claim 11, wherein the method further comprises: generating depender tags using a depender operation, based on an existence of an associated depender tag generated by a previously executed dependee operation, and wherein the existence of the dependee tag is a function of a confidence score of the dependee tag.

19. The method of claim 18, wherein the method further comprises:
   when it is ascertained that the dependee tag exists, skipping the execution of the depender operation; and
   when it is ascertained that the dependee tag does not exist, executing the depender operation to allow the depender tag to act as a fallback to the dependee tag.

20. The method of claim 18, wherein the method further comprises modifying confidence scores of depender tags produced by the depender operations, based on the existence of the dependee tags.

21. A non-transitory computer readable medium including machine readable instructions that are executable by a processor to:
   receive a request to process input data to generate tags for interpreting the input data;
   implement natural language processing operations to tag the input data with the tags, wherein the natural language processing operations include depender operations and dependee operations, and wherein the depender operations require tagged output of the dependee operations as input;
   identify dependees of the tags, and further dependees of the dependees of the tags, a dependee being one of a tag and a natural language operation upon which the tag depends, wherein at east one of natural language processing operations and resources required to provide an input for the natural language operation to generate the tags is identified for each dependent and further dependents;
   create a dependency graph, based on the identified dependents and the further dependents, the dependency graph including the natural language processing operations, corresponding dependents, and corresponding further dependents arranged in an order of and linked by their dependencies;
   generate a pipeline including a series of natural language operations, based on the dependency graph, wherein the pipeline includes a plurality of natural language processing operations to be executed in a predefined order to generate the tags; and
   provide the pipeline to generate the tags for interpreting the input data.

* * * * *